US010983579B2

(12) United States Patent
Cannell et al.

(10) Patent No.: US 10,983,579 B2
(45) Date of Patent: *Apr. 20, 2021

(54) HEALTHCARE ASSET TRACKER APPARATUS AND METHODS

(71) Applicant: General Electric Company, Schenectady, NY (US)

(72) Inventors: Matthew Cannell, Glen Allen, VA (US); Phillip Crawley, Glen Allen, VA (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/694,540

(22) Filed: Nov. 25, 2019

(65) Prior Publication Data

US 2020/0089303 A1 Mar. 19, 2020

Related U.S. Application Data

(63) Continuation of application No. 16/001,234, filed on Jun. 6, 2018, now Pat. No. 10,488,910.

(51) Int. Cl.
*H04W 4/20* (2018.01)
*G06F 1/3212* (2019.01)
(Continued)

(52) U.S. Cl.
CPC ............ *G06F 1/3212* (2013.01); *G06F 1/263* (2013.01); *H04W 4/021* (2013.01); *H04W 4/20* (2013.01);
(Continued)

(58) Field of Classification Search
None
See application file for complete search history.

(56) References Cited

U.S. PATENT DOCUMENTS 10,488,910 B1 11/2019 Cannell et al.
2009/0280826 A1* 11/2009 Malik ............... H04W 52/0261
455/456.1

(Continued)

OTHER PUBLICATIONS

United States Patent and Trademark Office, "Notice of Allowance," issued in connection with U.S. Appl. No. 16/001,234, dated Jul. 18, 2019, 18 pages.

(Continued)

*Primary Examiner* — Eunsook Choi

(57) ABSTRACT

Improved fixed receiver devices including both transmit and receive circuitry and operating on battery power are disclosed. An example transmitter/receiver location device includes a network interface to enable transmission and receipt of messages via a first communication medium and transmission and receipt of messages via a second communication medium. The example device includes a battery to provide power to the device, the battery to have a battery level and to be chargeable. The example device includes a memory to store instructions and data. The example device includes a processor to at least: process a beacon message received via the network interface; generate an information message for a location server based on location information from the beacon message and status information based on the battery level for the device; and adjust an operating state of the device based on the battery level.

20 Claims, 16 Drawing Sheets

(51) Int. Cl.
    *G06F 1/26*           (2006.01)
    *H04W 4/33*         (2018.01)
    *H04W 4/021*       (2018.01)
    *H04W 52/02*       (2009.01)

(52) U.S. Cl.
    CPC ......... *H04W 4/33* (2018.02); *H04W 52/0261* (2013.01)

(56) References Cited

U.S. PATENT DOCUMENTS

| | | | |
|---|---|---|---|
| 2015/0011196 A1* | 1/2015 | Jayakumar | H04W 4/33 455/418 |
| 2015/0119733 A1* | 4/2015 | Grubis | A61B 5/742 600/509 |
| 2015/0265903 A1* | 9/2015 | Kolen | G06Q 50/22 700/91 |
| 2015/0355308 A1* | 12/2015 | Ishida | G01S 5/12 455/456.1 |
| 2016/0323708 A1* | 11/2016 | Sahadi | H04W 64/003 |
| 2017/0245104 A1* | 8/2017 | Klimek | H04W 4/021 |
| 2017/0269016 A1* | 9/2017 | Anjum | A01G 22/00 |
| 2017/0374641 A1* | 12/2017 | Batra | H04B 17/27 |
| 2018/0038937 A1* | 2/2018 | Afzal | G01S 5/0226 |
| 2018/0129351 A1* | 5/2018 | Qiao | G06F 3/038 |
| 2018/0177397 A1* | 6/2018 | Kall | A61B 5/684 |
| 2019/0028904 A1* | 1/2019 | Carpenter | G08G 5/0091 |

OTHER PUBLICATIONS

United States Patent and Trademark Office, "Corrected Notice of Allowability," issued in connection with U.S. Appl. No. 16/001,234, dated Sep. 30, 2019, 8 pages.

* cited by examiner

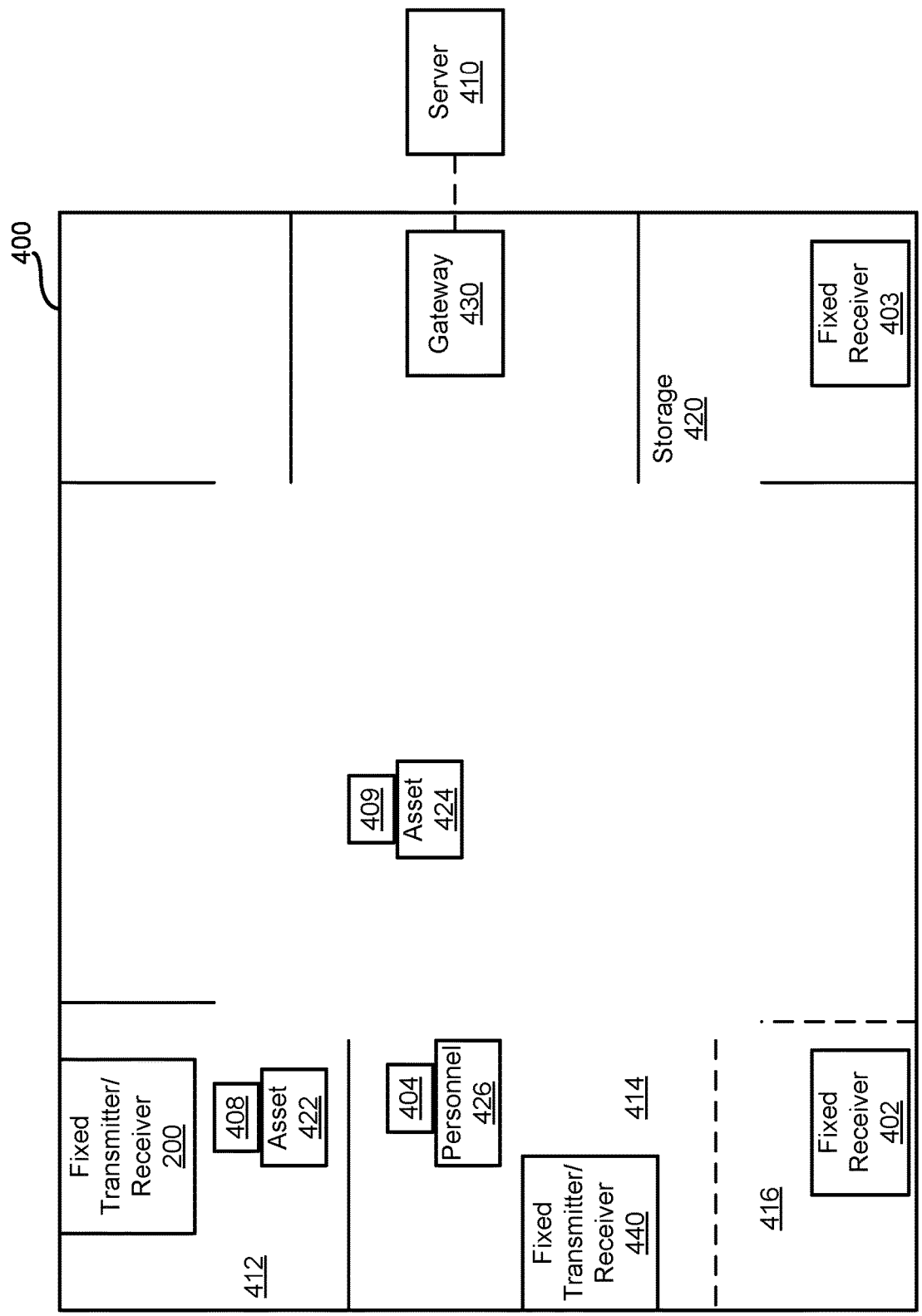

HEALTHCARE ASSET TRACKER APPARATUS AND METHODS

CROSS-REFERENCE TO RELATED APPLICATIONS

This patent arises as a continuation of U.S. Non-Provisional patent application Ser. No. 16/001,234 which was filed on Jun. 6, 2018. U.S. Non-Provisional patent application Ser. No. 16/001,234 is hereby incorporated herein by reference in its entirety. Priority to U.S. Non-Provisional patent application Ser. No. 16/001,234 is hereby claimed.

FIELD OF THE DISCLOSURE

This disclosure relates generally to transmitter/receiver location devices, and, more particularly, to healthcare asset tracker apparatus and methods.

BACKGROUND

Real-time location systems (RTLS) monitor asset distribution and usage, providing actionable information to help control costs and improve the quality and efficiency of care. Systems that have been developed to track and analyze activities in clinical settings have included installing Radio Frequency Identification (RFID) and infrared (IR) reader infrastructures into buildings to capture position information. RFID sensors may be placed on the people and/or assets that need to be tracked.

However, this is an expensive and time-consuming solution because it requires pulling power and data cabling to all the required locations. Location accuracy can also vary depending on technology. Typical RFID systems have a tolerance of approximately plus-or-minus ten feet, further limiting their range. RFID and IR-based sensors, though, are highly susceptible to drift due to interference in the environment (e.g., a patient room) and cross talk between locations that are physically separated but have a line of sight between them (e.g., two patient rooms across the hall from each other).

Therefore, it would be desirable to design a system and method for tracking locations and interactions between people and assets in an environment with minimal infrastructure requirements and standardized technologies.

BRIEF DESCRIPTION

Certain examples provide improved fixed receiver devices including both transmit and receive circuitry and operating on battery power.

Certain examples provide a transmitter/receiver location device to be affixed to a surface. The example device includes a network interface to enable transmission and receipt of messages via a first communication medium and transmission and receipt of messages via a second communication medium. The example device includes a battery to provide power to the device, the battery to have a battery level and to be chargeable. The example device includes a memory to store instructions and data. The example device includes a processor to at least: process a beacon message received via the network interface; generate an information message for a location server based on location information from the beacon message and status information based on the battery level for the device; and adjust an operating state of the device based on the battery level.

Certain examples provide a method of real-time location tracking in a healthcare environment. The example method includes processing, using a controller in a battery-powered fixed transmitter/receiver location device, a beacon message received from a beacon via a network interface, the network interface to enable transmission and receipt of messages via a first communication medium and transmission and receipt of messages via a second communication medium. The example method includes generating, using the controller, an information message for a location server based on location information from the beacon message and status information based on a battery level for the transmitter/receiver location device. The example method includes transmitting, via at least one of the first communication medium or the second communication medium, the information message. The example method includes adjusting, using the controller, an operating state of the transmitter/receiver location device based on the battery level.

Certain examples provide at least one tangible computer-readable storage medium including instructions which, when executed by at least one processor, cause the at least one processor to at least: process an information message received from a battery-powered transmitter/receiver location device to extract battery information for the transmitter/receiver location device from the information message; predict battery life for the transmitter/receiver location device based on the battery information; incorporate a maintenance window in the battery life prediction; generate a maintenance schedule for the transmitter/receiver location device using the battery life prediction; and transmit battery life information to the transmitter/receiver location device.

BRIEF DESCRIPTION OF THE DRAWINGS

The features and technical aspects of the system and method disclosed herein will become apparent in the following Detailed Description set forth below when taken in conjunction with the drawings in which like reference numerals indicate identical or functionally similar elements.

DETAILED DESCRIPTION

Figure 1:
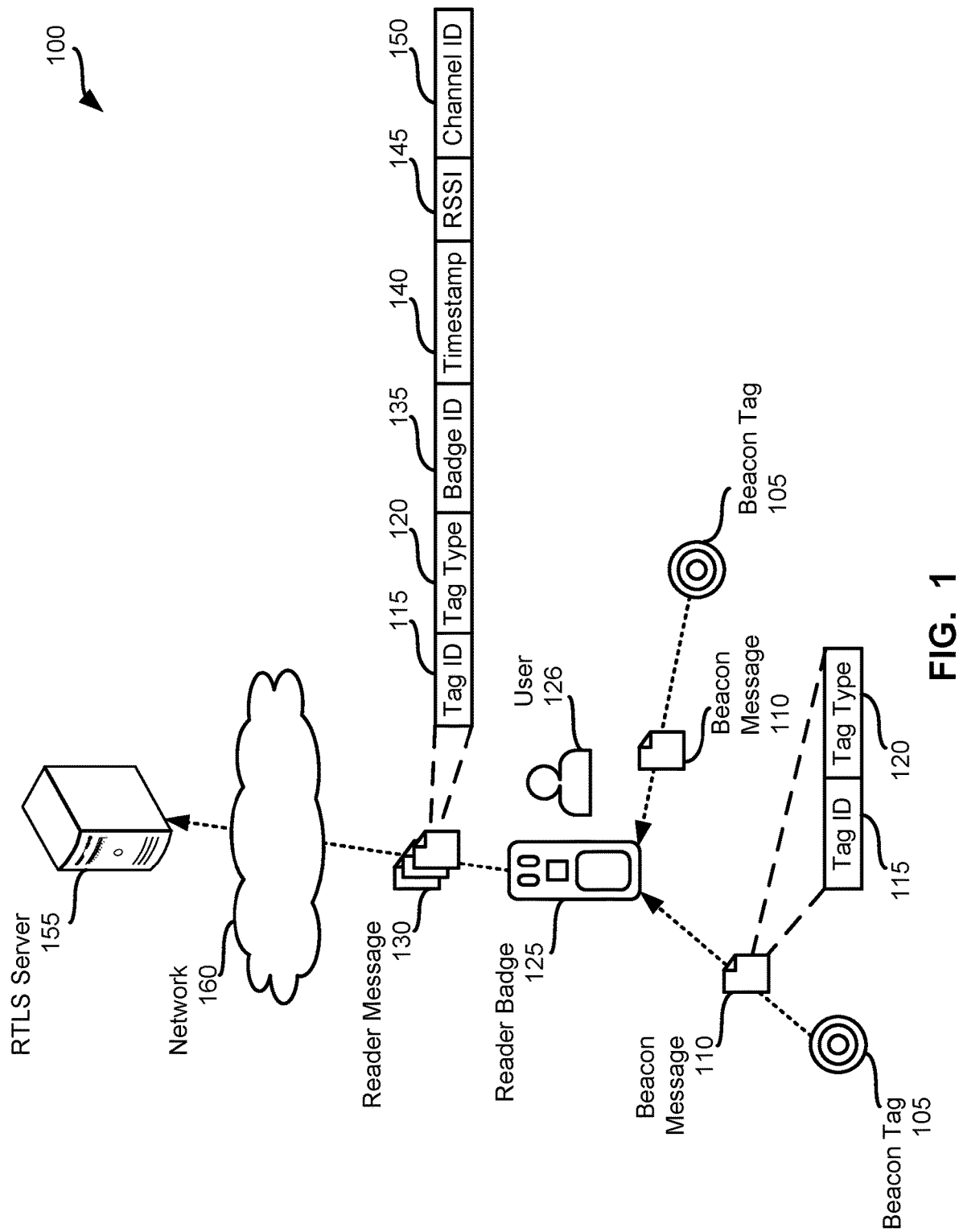
FIG. 1 is a block diagram illustrating an example environment constructed in accordance with the teachings of this disclosure to facilitate proximity detection and location tracking.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and other changes may be made without departing from the scope of the subject matter of this disclosure. The following detailed description is, therefore, provided to describe an exemplary implementation and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As used herein, the terms "system," "unit," "module," "engine," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, engine, or system may include a hard-wired device that performs operations based on hard-wired logic of the device. Various modules, units, engines, and/or systems shown in the attached figures may represent the hardware that operates based on software or hardwired instructions, the software that directs hardware to perform the operations, or a combination thereof.

I. Overview

Certain examples of the presently disclosed technology improve proximity detection and location tracking of resources in an environment such as a hospital. Certain examples provide a portable-powered, multi-use, crowd-source-enabled, multimodal transmitter/receiver device for location-based tracking. An example system disclosed herein includes one or more beacon tags affixed to assets within the environment and that transmit (e.g., periodically, aperiodically and/or as a one-time event) beacon messages. The beacon messages are received by a mobile reader badge that listens for beacon messages transmitted in the environment. For example, disclosed example reader badges (sometimes referred to herein as "readers," "badges," "mobile wireless bridges," or "beacon badges") may include a network interface to receive beacon messages transmitted via low power Bluetooth Low Energy (BLE) and/or other low-power, short-range radio frequency wireless communication. In some disclosed examples, the reader badges process the received beacon messages and communicate information obtained from the beacon messages to one or more real-time location services (RTLS) servers via a communication infrastructure. For example, disclosed example reader badges may aggregate and communicate a batch of beacon messages (e.g., a threshold number of beacon messages, a threshold interval of time (e.g., a window of interest), etc.) to an RTLS server via a Wi-Fi infrastructure (e.g., a wireless network). In some disclosed examples, the RTLS server processes the received batch of beacon messages to facilitate real-time location tracking of the resources in the environment. In some disclosed examples, the RTLS server may report the location of resources via charts, graphs, tables, etc.

Real-time location services enable improved patient workflow via proximity detection and location tracking in a healthcare environment, such as a hospital. Location tracking can be used to locate resources such as mobile assets (e.g., patients, intravenous (IV) pumps, telemetry units, wheelchairs, etc.) within the hospital. For example, location tracking can be used to locate a "lost" or "missing" IV pump within a patient's room. Proximity detection facilitates an improved understanding of how interactions occur during the patient workflow. For example, based on the proximity to a soap dispenser, a user (e.g., a system administrator) can determine whether a caretaker washed their hands prior to interacting with a patient.

Examples systems and methods disclosed herein facilitate improved proximity detection and location tracking by creating a hospital tracking network within the hospital using the communication infrastructure already installed in the hospital. Beacon tags are installed throughout a location or building. For example, beacon tags can be affixed to stationary assets (e.g., patient room entry ways, sinks, water fountains, hallways, etc.) and mobile assets such as hospital beds, IV pumps, soap dispensers, etc. In some disclosed examples, the beacon tags are also included in disposable patient tags provided to the patient upon admission of a hospital stay. Beacon tags are low-cost, low-power transmitters of beacon messages. A beacon message (sometimes referred to herein as a "beacon") includes information about the beacon tag such as a unique identifier (e.g., a tag identifier such as a media access control (MAC) address) and a tag type identifier (e.g., whether the beacon tag is affixed to a fixed-location asset or to a mobile asset). In some disclosed examples, the beacon tags broadcast (e.g., advertise, communicate, transmit, etc.) beacon messages at pre-set frequencies (e.g., ten times a second, once a second, once a minute, etc.). For example, a beacon tag affixed to a fixed-location asset (e.g., a sink) may broadcast beacon messages ten times a second, while a beacon tag affixed to a mobile asset (e.g., a wheelchair) may broadcast beacon messages at relatively shorter intervals (e.g., once a second).

A reader badge is a mobile wireless bridge that facilitates mobile tracking by "listening" and receiving beacon messages broadcast by beacon tags. The reader badge includes a BLE controller (and/or other low-power, short-range radio frequency wireless controller) to receive connection-less beacon messages broadcast by beacon tags. The reader badge also includes a Wi-Fi controller to establish a connection with an RTLS server. The reader badge may be worn or transported by hospital caregivers. For example, a reader badge may be worn as a lanyard or clipped to the caregiver's clothing. As the caregiver moves about the hospital, the reader badge passively collects beacon messages and communicates reader messages to an RTLS server at the backend of the system. In some examples, the reader badge collects a number (e.g., a predetermined number) of beacon messages or waits a period (e.g., a predetermined period of time) prior to communicating the reader messages. In some examples, the reader badge generates and communicates a reader message as a beacon message from a beacon tag is received. A reader message includes information received from the beacon message such as a unique identifier of the source beacon tag and a spatial location of the source beacon tag. In some examples, the reader badge includes a timestamp identifying when the beacon message was received by the reader badge in the reader message. In some examples, the reader badge includes a received signal strength indication (RSSI) value (e.g., a power ratio in decibels of the measured power to one milli-watt (dBm)).

Example reader badges disclosed herein include a proximity engine to process the beacon messages and determine distance from the source (e.g., the beacon tag that broadcast the corresponding beacon message). For example, a hospital room may include a first beacon tag affixed to a door, a second beacon tag affixed to an infusion pump, a third beacon tag affixed to a bed, and a fourth beacon tag included in a patient tag (e.g., a disposable bracelet including patient identification information such as name, sex, date of birth information). As the caregiver moves about the hospital room, the reader badge may receive beacon messages from each of the beacon tags. The proximity engine can determine the RSSI strength for each of the beacon messages and associate RSSI strength with a respective beacon tag.

In some examples, the proximity engine determines which beacon tags are proximate (e.g., near or closely located) to the reader badge. For example, the proximity engine can compare the RSSI strength of a beacon message to a threshold and if the RSSI strength satisfies the threshold (e.g., the RSSI strength is greater than a threshold), the proximity engine identifies the source beacon tag as proximate to the reader badge. In some examples, the proximity engine discards beacon messages that are not proximate to the reader badge.

Example systems and methods disclosed herein include an RTLS server that monitors and/or reports tracking location and interactions between people and assets in an environment. For example, the RTLS server can aggregate reader messages from the one or more reader badges included in an environment (e.g., the hospital). The RTLS server may be in connection with the reader badges via a wireless Intranet network (e.g., a wireless local area network, etc.) and/or a wireless Internet connection.

As healthcare assets continue to become smaller and more ergonomic, RTLS tracking with a small footprint becomes increasingly important. Additionally, as a hospital's inventory of healthcare equipment gets leaner, the equipment is likely to be cleaned more often. Therefore, an asset tracking beacon should withstand frequent, repeated cleaning with harsh disinfecting chemicals.

Certain examples provide an improved housing that can be applied with BLE and/or other low-power, short-range radio frequency wireless location tracking technology to healthcare assets (e.g., scanner, IV pumps, monitors, etc.). In certain examples, a computerized maintenance management system (CMMS) and/or source system can organize and monitor assets and can remove and re-associate beacons from one asset to another asset on demand. Beacons can be installed on ergonomic items that do not have flat surfaces. Beacons can be developed with housings to withstand rigorous healthcare cleaning protocols while maintaining a small footprint to not disturb normal usage of equipment to which the beacon is applied.

In certain examples, a single device can be provided with receiver and transmitter capability and includes a battery as well as a connection for direct current (DC) and/or alternating current (AC) power supply. The example device can listen (receive) and transmit via Bluetooth Low Energy (BLE), and the device can communicate via Wi-Fi (e.g., as an 802.11-compliant client). The example device can be installed anywhere within a hospital and/or other healthcare facility and can be logged in a geographical information system (GIS) database to provide the device with a known mapped location. The example device can receive Bluetooth information from mobile assets equipped with an asset beacon to position the mobile assets accurately and transmits a Bluetooth Low Energy (BLE) advertisement packet that can assign positions to other mobile devices and computers in the GIS database while transmitting data over a customer's wireless network (Wi-Fi) on demand at configurable frequencies for data backhaul to the cloud, for example.

Certain examples provide multi-device meshing and high availability so that location positioning is not affected when an individual device is offline. Certain examples enable improved triangulation/trilateration positioning.

While prior devices depend on users wearing and charging mobile receivers, certain examples provide devices that are battery-powered and mobile as well as mountable to provide real-time location services without relying on human user behavior. Certain examples "crowdsource" or leverage a surrounding network or infrastructure of receivers, beacons, etc., for improved, more accurate location services. In certain examples, mobile devices can serve as virtual mobile receivers acting as crowdsource devices in concert with the battery-powered, multi-use, receiver/transmitter device described herein. By providing battery power, such devices can be globally applicable regardless of differences in power outlet configuration, power supply, hospital rules and regulations, etc.

II. Example Hospital Tracking Network

Real-time location services (RTLS) facilitate tracking people and assets in an industrial setting, such as a hospital. The example RTLS system described herein is designed to create location awareness of assets by capturing location and proximity information from beacon tags installed throughout the hospital. Examples disclosed herein utilize reader badges worn by healthcare workers (e.g., doctors, nurses, administrators, janitors, etc.) that receive beacon messages from beacon tags that are installed in and/or affixed to assets such as hallways, rooms, equipment, patients, etc. for which location and/or proximity information is to be collected between the beacon tags and the tagged asset. For example, the beacon tags may broadcast beacon messages including a unique identifier (e.g., a signature, a media access control (MAC) address, a serial number, etc.) associated with the corresponding beacon tags. As the healthcare workers walk around the hospital, their reader badges collect beacon messages transmitted from beacon tags throughout the hospital. In some disclosed examples, the reader badges aggregate the beacon messages and transmit a batch of beacon messages to an RTLS server for processing. The example RTLS server disclosed herein processes the beacon messages to create location awareness through proximity and probability.

In some disclosed examples, beacon tags are installed in and/or attached to fixed-location (e.g., placed on stationary (or near stationary)) assets. For example, some "known location" beacon tags may be affixed to hallways, doors, windows, sinks, etc. As disclosed below, in some examples, the RTLS server utilizes the beacon messages received from "known location" beacon tags to determine a location for the reader badge.

In some disclosed examples, beacon tags are affixed to mobile assets such as equipment. For example, some "mobile location" beacon tags may be affixed to beds, wheelchairs, patients, etc. As disclosed below, in some examples, the RTLS server utilizes the beacon messages received from the "mobile location" beacon tags to determine what assets are near the corresponding reader badges (e.g., the reader badge that aggregated and transmitted a batch of beacon messages).

In addition, comparing the asset locations during different timestamp intervals may be useful in determining how the assets were moved and/or when caregivers interacted with the assets. For example, consider an example in which a wheelchair (e.g., a mobile-location asset) is located in a first patient room. In the illustrated example, assume that the wheelchair is affixed with a mobile-location asset beacon tag and that the first patient room is affixed with a fixed-location asset beacon tag. In the illustrated example, when a caregiver wearing a reader badge walks into the first patient room, their reader badge collects beacon messages broadcast by the wheelchair beacon tag and the first patient room beacon tag. In the illustrated example, the caregiver location is assigned to the first patient room based on the beacon messages broadcast by the first patient room beacon tag. In addition, since the wheelchair is "seen" in the same location, the wheelchair location may also be updated to the first patient room.

In the illustrated example, while the caregiver is in the first patient room, their reader badge collects beacon messages broadcast by the wheelchair beacon tag and the first patient room beacon tag. If the caregiver begins moving the wheelchair (e.g., from the first patient room to a second patient room), their reader badge will continue to collect beacon tags broadcast by the first patient room badge tag but will also begin collecting beacon messages broadcast by a second patient room beacon tag. In the illustrated example, once the caregiver enters the second patient room, the caregiver location is updated to the second patient room. Additionally, in the illustrated example, since the wheelchair is still "seen" by the caregiver (e.g., the wheelchair location is determined to be proximate to the caregiver), the location of the wheelchair is also updated to the second patient room.

In the illustrated example, after the wheelchair is moved from the first patient room to the second patient room, confidence that the wheelchair is located in the second patient room rather than the first patient room may be low. However, in the illustrated example, each time a caregiver walks into the first patient room and does not "see" the wheelchair, confidence that the wheelchair is located in the first patient room decreases. Additionally, in the illustrated example, each time a caregiver walks into the second patient room and does "see" the wheelchair, confidence that the wheelchair is located in the second patient room increases. In the illustrated example, the "crowd" (e.g., the caregivers) provides different snapshots of what is "seen" at different locations and at different times. As disclosed herein, an RTLS server may analyze the different snapshots to facilitate proximity detection and location tracking of assets in an environment.

Referring to FIG. 1, an example environment 100 in which examples disclosed herein can be implemented to facilitate proximity detection and location tracking is illustrated. The example environment 100 of FIG. 1 includes example beacon tags 105, an example reader badge 125 and an example real-time location services (RTLS) server 155.

In the illustrated example of FIG. 1, the beacon tags 105 are implemented using low-power BLE or other low-power, short-range radio frequency wireless transmitters and include a single coin-cell battery. In some examples, the single coin-cell battery provides power to the corresponding beacon tag 105 for two or more years. In the illustrated example, beacon tags 105 are installed throughout the environment 100 on two types of assets. For example, one or more beacon tag(s) 105 may be located on (e.g., affixed to) fixed-location assets such as doors, rooms, hallways, water fountains, etc. In addition, one or more beacon tag(s) 105 may be located on (e.g., affixed to) mobile-location assets such as patients (e.g., inserted within a patient tag), beds, IV pumps, wheelchairs, etc. Although the illustrated example of FIG. 1 includes only two beacon tags 105, other environments are likely to include additional beacon tags. For example, different environments may include tens, hundreds and/or thousands of beacon tags affixed to assets. In general, accuracy of the proximity detection and location tracking of assets in an environment is increased and/or decreased based on adding or reducing the number of beacon tags placed in the environment.

In the illustrated example of FIG. 1, the example beacon tags 105 periodically advertise their presence in the environment 100. For example, the beacon tags 105 may broadcast example beacon messages 110 every one second. In other examples, the beacon tags 105 may broadcast beacon messages 110 aperiodically and/or as a one-time event. In some examples, the beacon tags 105 may broadcast beacon messages 110 at different time intervals. For example, beacon tags 105 located on fixed-location assets may broadcast beacon messages 110 every two seconds, while beacon tags 105 located on mobile-location assets may broadcast beacon messages 110 every second. In some examples, beacon tags located on mobile-locations assets may broadcast beacon messages 110 at a first frequency (e.g., once every second) while the mobile-location asset is stationary and may broadcast beacon messages 110 at a second frequency (e.g., once every half-second) while the mobile-location asset is moving. However, other time intervals may additionally or alternatively be used.

In the illustrated example, the beacon messages 110 include tag identifying information 115 and tag-type identifying information 120. For example, tag identifying information 115 may be a unique identifier of the beacon tag 105 such as a MAC address, a serial number, an alphanumeric signature, etc. The example tag-type identifying information 120 identifies whether the beacon tag 105 broadcasting the beacon message 110 is affixed to a fixed-location asset or affixed to a mobile-location asset. However, the beacon messages 110 may include additional or alternative information. For example, the beacon messages 110 may include information identifying the software version being executed by the beacon tags 105, may include information identifying a power level of the beacon tag 105, etc.

In the illustrated example of FIG. 1, the beacon messages 110 are received by the reader badge 125. In the illustrated example, the reader badge 125 is worn by a hospital caregiver 126 such as a doctor, a nurse, etc. As the hospital caregiver moves through the hospital, the reader badge 125 collects beacon messages 110 broadcast by the beacon tags 105. For example, while the hospital worker 126 is visiting a patient in an example patient room #1, the example reader badge 110 may collect one or more beacon message(s) from a fixed-location asset beacon tag located on a door of the patient room #1, one or more beacon message(s) from a fixed-location asset beacon tag located on a sink in the patient room #1, one or more beacon message(s) from a mobile-location asset beacon tag located on the patient's identification tag, one or more beacon message(s) from a mobile-location asset beacon tag located on a bed in the patient room #1, etc.

In the illustrated example of FIG. 1, the reader badge 125 generates example reader messages 130 in response to receiving the beacon messages 110. For example, the reader badge 125 may create a reader message 130 including the tag identifying information 115 and the tag-type identifying information 120 included in the beacon message 110 and append example badge identifying information 135, an example timestamp 140, example signal strength information 145, and example channel identifying information 150.

In the illustrated example, the badge identifying information 135 is a string of alphanumeric characters that uniquely identifies the reader badge 110 (e.g., a MAC address, a serial number, an alphanumeric signature, etc.). The example timestamp 140 identifies a date and/or time (e.g., Jan. 1, 2015, 9:10:04 μm) when the beacon message 110 was received by the reader badge 125. The example signal strength information 145 identifies signal strength of the beacon message 110 when it was received by the reader badge 125 (e.g., a received signal strength indication (RSSI) value). The example channel identifying information 150 identifies a channel on which the beacon message 110 was received (e.g., a Bluetooth and/or other low-power, short-range radio frequency wireless frequency channel such as channel 37, channel 38 or channel 39, etc.).

In the illustrated example of FIG. 1, the reader badge 125 periodically communicates a group (e.g., a batch) of reader messages 130 to the RTLS server 155. For example, the reader badge 125 may transmit one or more reader messages 130 that were collected over a period of time (e.g., thirty seconds). Additionally or alternatively, the reader badge 125 may communicate one or more reader message(s) 130 aperiodically and/or as a one-time event. For example, the reader badge 125 may collect a threshold number of reader messages 130 prior to transmitting the collected reader messages 130 to the RTLS server 155. In some examples, the reader badge 125 transmits the reader messages 130 as they are created by the reader badge 125.

In the illustrated example of FIG. 1, the RTLS server 155 is a server and/or database that facilitates proximity detection and location tracking. In some examples, the RTLS server 155 is implemented using multiple devices. For example, the RTLS server 155 may include disk arrays or multiple workstations (e.g., desktop computers, workstation servers, laptops, etc.) in communication with one another.

In the illustrated example, the RTLS server 155 is in communication with the reader badge 125 via one or more wireless networks represented by example network 160. Example network 160 may be implemented using any suitable wireless network(s) including, for example, one or more data busses, one or more wireless Local Area Networks (LANs), one or more cellular networks, the Internet, etc. As used herein, the phrase "in communication," including variances thereof (e.g., communicates, in communication with, etc.), encompasses direct communication and/or indirect communication through one or more intermediary components and does not require direct physical (e.g., wired) communication and/or constant communication, but rather additionally includes communication at periodic or aperiodic intervals, as well as one-time events.

In the illustrated example of FIG. 1, the RTLS server 155 utilizes the reader messages 130 to facilitate proximity detection and location tracking of assets in the environment 100. In the illustrated example, the RTLS server 155 selects a portion of reader messages 130 received from the reader badge 125 to determine a location of the reader badge 125. For example, the RTLS server 155 may process the reader messages 130 to identify a first subset of reader messages 130 (e.g., one or more reader messages) that were received by the reader badge 125 during a first window of interest (e.g., a five second window) and that were fixed-location asset tag type (e.g., based on the tag-type information 120 included in the first subset of reader messages). In the illustrated example of FIG. 1, the RTLS server 155 utilizes the signal strength information 145 included in the first subset of reader messages 430 to determine a nearest fixed-location asset. For example, a relatively stronger RSSI value may indicate that the broadcasting beacon tag 105 is closer in proximity to the reader badge 125 than a beacon tag 105 associated with a relatively weaker RSSI value. In the illustrated example of FIG. 1, the RTLS server 155 updates the location of the reader badge 125 based on the nearest fixed-location asset.

In the illustrated example of FIG. 1, once the RTLS server 155 associates the reader badge 125 with a location (e.g., the location of the nearest fixed-location asset, etc.), the RTLS server 155 identifies a second subset of reader messages 130 (e.g., one or more reader messages, etc.) that were received by the reader badge 125 during the first window of interest (e.g., a five second window, etc.) and that were mobile-location asset tag type (e.g., based on the tag-type information 120 included in the second subset of reader messages 130, etc.). For example, the RTLS server 155 may update the location of a mobile-location asset based on its proximity to the reader badge 125.

In the illustrated example of FIG. 1, the RTLS server 155 selects a reader message of the second subset of reader messages 130 and classifies the corresponding mobile-location assets relative location to the reader badge 125 based on the RSSI value 155 included in the selected reader badge 130. For example, the RTLS server 155 classifies mobile-location asset as relatively-far assets when the signal strength information 155 satisfies a first threshold (e.g., the RSSI value is less than (−60) decibels, etc.). The example RTLS server 155 of FIG. 1 classifies mobile-location assets as relatively-immediate assets when the signal strength information 155 satisfies a second threshold (e.g., the RSSI value is greater than (−40) decibels, etc.). In the illustrated example of FIG. 1, the RTLS server 155 classifies mobile-location assets as relatively-near assets when the signal strength information 155 does not satisfy the first threshold and the second threshold. For example, the RTLS server 155 may classify mobile-location assets as relatively-near assets when the RSSI value is less than (−40) decibels and greater than (−60) decibels.

In the illustrated of FIG. 1, depending on the relative location classifications, the RTLS server 155 updates the location of the mobile-location asset and/or updates an asset-location confidence score associated with the mobile-location asset. In the illustrated example, the asset-location confidence score represents a probability (or likelihood) that a mobile-location asset may be found at the currently assigned asset-location. For example, when a mobile-location asset is "seen" in the same location, the RTLS server 155 increases the asset-location confidence score of the mobile-location asset. When the mobile-location asset is "seen" in a different location, the RTLS server 155 decreases the asset-location confidence score of the mobile-location asset. Additionally, when the asset-location confidence score fails to satisfy a location threshold (e.g., is less than a location threshold, etc.), the asset-location of the mobile-location asset may be updated based on, for example, the location of the reader badge 125 that collected the beacon message 110 emitted from the mobile-location asset (e.g., by the beacon tag 105 affixed to the mobile-location asset, etc.).

In the illustrated example, when a mobile-location asset is classified as relatively-far, the example RTLS server 155 of FIG. 1 discards the reader message 130 and the RTLS server 155 makes not change to the location of the mobile-location asset and/or the asset-location confidence score associated with the mobile-location asset. For example, the reader badge 125 may have collected a relatively weak beacon message emitted from a mobile-location asset passing through the hallway outside of the patient room #1. In some examples, the reader badge 125 may filter such beacon messages (e.g., beacon messages 110 that are associated with weak (e.g., low) RSSI values, etc.) rather than communicate the weak beacon messages to the RTLS server 155.

When a mobile-location asset is classified as a relatively-immediate asset, high signal strength (e.g., an RSSI value greater than (−40) decibels, etc.) may be indicative of a mobile-location asset that is in-front of the hospital worker 126, is being used by the hospital worker 126 and/or is being moved by the hospital worker 126. In some such instances, the location of the mobile-location asset may be assumed to be the same as the location of the reader badge 125. In the illustrated example, the example RTLS server 155 of FIG. 1 updates the location of the mobile-location asset to the location of the reader badge 125. In addition, the example RTLS server 155 increments the asset-location confidence score of the mobile-location asset (e.g., the probability of the mobile-location asset being located at the updated asset-location is increased, etc.). In some examples, if the beacon tag 105 is relatively-immediate to the reader badge 125, an assumption may be made that the caregiver is interacting with the corresponding assets. For example, the caregiver may be pushing a patient in a wheelchair.

In the illustrated example of FIG. 1, when a mobile-location asset is classified as a relatively-near asset (e.g., is associated with a medium signal strength, etc.), the example RTLS server 155 of FIG. 1 compares the current location associated with the mobile-location asset to the location of the reader badge 125. In the illustrated example, the RTLS server 155 increases the asset-location confidence score of the mobile-location asset when the current asset-location is the same as the location of the reader badge 125. For example, the mobile-location asset is "seen" in the same location as it is currently assigned. In some examples when the current asset-location is not the same as the location of the reader badge 125, the example RTLS server 155 decreases the asset-location confidence score of the mobile-location asset. In addition, the example RTLS server 155 compares the asset-location confidence score of the mobile-location asset to a location threshold and, when the asset-location confidence score fails to satisfy the location threshold (e.g., is less than the location threshold, etc.), the RTLS server 155 updates the asset-location of the mobile-location asset to the location of the reader badge 125 that received the corresponding beacon message 110.

Typically, different products have separate, distinct functions, such as a receiver that listens for beacons and relays data and beacons or tags that advertise (e.g., via BLE, etc.) identity information. The receiver can be a mobile receiver (e.g., a wearable device), for example, which can be difficult for people to wear (e.g., awkward and gets in the way, etc.). The mobile receiver relies on multiple people wearing them to provide sufficient location accuracy. If a sufficient number of people in a healthcare environment are not wearing the mobile receivers, then accuracy is not sufficient to locate and track assets. If a fixed receiver (e.g., positioned on a wall) is used, that receiver does not crowdsource because the receiver does not move. The fixed receiver is always on, is always listening for beacons, and is always sending data. The fixed receiver needs an outlet for power and cannot be positioned in all places. For example, an outlet may not be available where a fixed receiver should be positioned, the fixed receiver may be in the way and get bumped or damaged in a high traffic area, etc. Thus, such mobile and fixed receivers can be deficient for the needs in many healthcare environments.

To address these deficiencies and provide innovative solutions to these deficiencies to provide better accuracy, better performance, increased utility, and improved, different receiver/transmitter operation, certain examples provide a combined receiver/transmitter device enabled with a battery to provide different operation, different structure, and increased flexibility in dynamic operation beyond prior approaches in a way that is not well-understood, not routine, and not conventional. Certain examples provide a battery-operated fixed receiver which also includes a transmitter beacon that can crowdsource to combine its data with that of mobile badges worn by people, attached to equipment, etc.

In certain examples, the battery-powered fixed transmitter/receiver is idle or asleep until triggered (e.g., based on movement, etc.) to monitor for beacon signals, etc. Thus, power and communication traffic can be conserved in the healthcare environment when there is no activity to monitor (e.g., in a non-egress area such as storage, etc.). For example, in a hospital setting, assets may sit for long periods of time. However, an accurate count of assets is necessary to ensure sufficient inventory to meet patient needs. The fixed transceiver device can be put in such areas and can be idle until triggered by movement, timing, etc. For example, the device can be triggered by movement detected within range of the device. The device can be triggered by time of day and/or other event (e.g., at an end of a shift, when a patient checks out, etc.), for example. By activating the device infrequently, power can be conserved. Such devices can work with other powered devices in high traffic areas involving more monitoring and more power to provide a complete picture of the healthcare environment, for example.

In certain examples, while other fixed receivers have omni-directional antennas which can detect activity in an adjacent room and/or other space aside from the space in which the receiver is placed, the transmitter/receiver device can be provided with directional antennas such as forward-facing antennas to restrict a scope of detection to a room or space in which the device is placed.

Figure 2A:
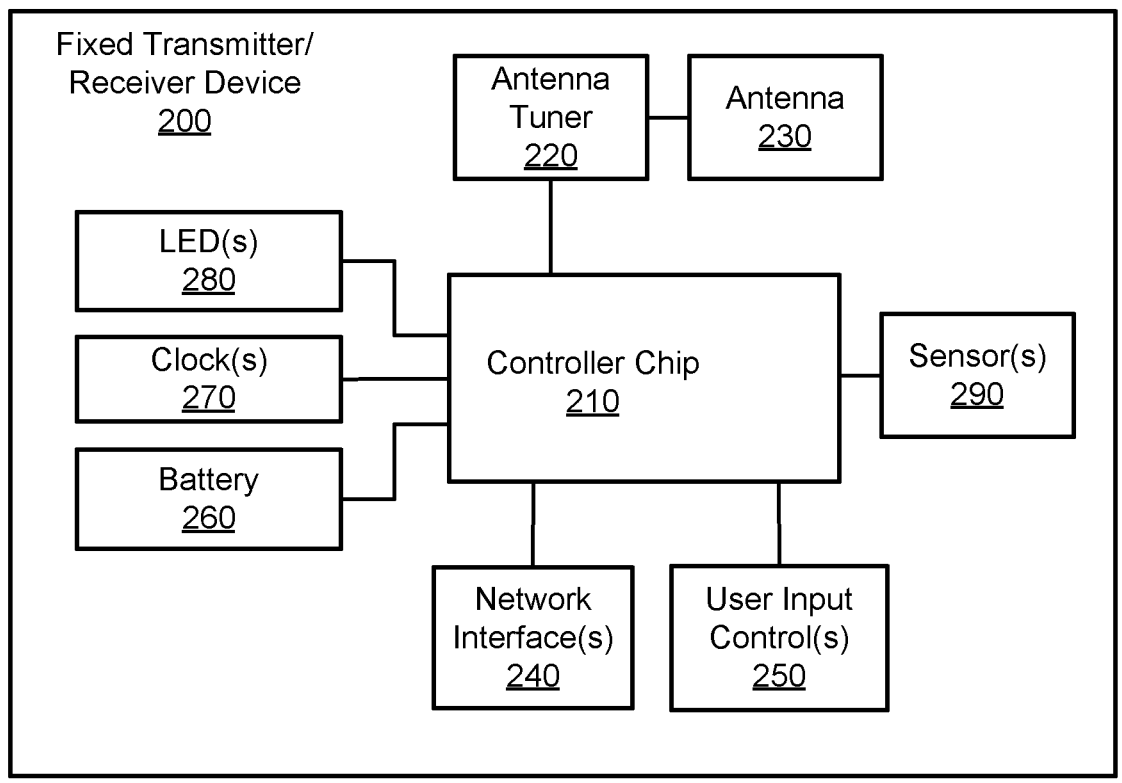
FIGS. 2A-2B are block diagrams of an example fixed transmitter/receiver device.

FIG. 2A is a block diagram of an example fixed, battery-powered transmitter/receiver location device 200. The example device 200 can be outlet and/or battery powered and can receive and/or transmit location and/or status information to another device (e.g., another receiver, an RTLS server, an access point/relay, etc.) in a healthcare environment. The example device 200 includes a controller chip or processor 210 (e.g., a BLE control chip, etc.), an antenna tuner 220, an antenna 230, one or more network interfaces 240, one or more user input controls 250, a battery 260, one or more clocks 270, one or more light-emitting diodes (LEDs) 280, one or more sensors/sensor interfaces 290, etc.

The example device 200 of FIG. 2A includes the controller chip 210 to control operations for the device 200 including radio communication, application execution, timing, memory operation, mode/state operation, etc. As described further below, the example controller chip 210 (e.g., a TI CC26xx, TI CC13xx, etc.) can include a processor (e.g., a central processing unit (CPU), general processing unit (GPU), etc.), a radio frequency (RF) core for radio communication, sensor control, peripheral control, etc.

The example device 200 of FIG. 2A uses the antenna tuner 220 and associated antenna 230. In certain examples, the antenna 230 is implemented using a printed circuit board (PCB) layout antenna. The antenna 230 can be directional, such as forward-facing, rather than omni-directional, to detect activity in a certain area/direction, for example. In certain examples, the device 200 also includes debugging provisions for updating beacon code, performing diagnostic testing and optional external antenna testing via the antenna tuner 220. Antenna 230 transmit performance is dependent on the housing design as it impacts the antenna performance, for example.

The one or more network interfaces 240 of the example device 200 of FIG. 2A include a universal asynchronous receiver/transmitter (UART) communication interface, a wireless (e.g., Wi-Fi™) interface, etc. The example network interface(s) 240 can be used to facilitate communication with another device, such as the beacon tag 105, mobile reader badge 125, etc., and/or for programming, debugging, etc. For example, the device 200 allows over the air (OTA) programming and parameter changes via the interface(s) 240.

The example device 200 of FIG. 2A includes one or more user input controls 250 such as a push button switch to activate/deactivate the controller 210, reset, change mode, etc. For example, pushing the button switches the device 200 between an operational mode, a connect mode, a power save/wake mode, a programming mode, etc.

The example device 200 of FIG. 2A includes a battery 260, such as a circular, button, or coin cell battery (e.g., CR2032, etc.) to power components of the device 200. The battery 260 is defined by a desired life of the device 200 and power the device 200 consumes, for example. The battery 260 can be powered to provide continuous operation of the device 200 for 1-2 years and intermittent operation for much longer than that, for example. Battery life and/or power consumption for the device 200 can be impacted by transmit power (e.g., range, antenna gain, antenna power, etc.), blink rate (e.g., number of chirps per second, number of channels used during chirp, power consumption of the chirp, etc.), battery size, etc. In certain examples, the battery 260 provides one or more programmable power levels to the device 200. In certain examples, the device 200 also includes an input for outlet-based power (e.g., direct current, alternating current, etc.).

In certain examples, the device 200 includes a plurality of batteries 260 (e.g., a primary battery and a secondary/backup battery, etc.) to extend device 200 operating life. For example, first and second batteries 260 can be removably housed in the device 200. A third battery can be in a charger such that when a charge on the first battery 260 drops below a certain threshold or level of usable battery life, the second battery 260 activates to drive operation of the device 200, for example. When a charge on the second battery 260 drops between a threshold or level of usable battery life, maintenance of the device 200 is triggered to replace the first and/or second battery 260 with the third battery and/or other charged battery, for example.

In some examples, when power switches from the first battery to the second battery 260, a maintenance trigger is generated by the device 200, RTLS server 155, and/or other device to replace the first battery 260 so that the device 200 remains in continuous operation with battery 260 power. In certain examples, low power can trigger a change in operation of the device 200 (e.g., turning off Wi-Fi transmission and relying on Bluetooth communication with another nearby device 200 relay data to the server 155 rather than communicating with the server 155 and/or a gateway directly via wireless communication. Battery 260 replacement and/or other charging of the device 200 can trigger resumption of a normal operating mode from the lower mode, for example.

For example, transmit power has an impact on battery life. Transmit power is defined by several factors which include range/coverage and antenna design, for example. The transmit power can be adjusted to address antenna gain and coverage for a given beacon usage. The example device 200 can be designed to cover a 4 to 8 feet wide aisle with a distance between beacons 4 to 8 feet, for example. In certain examples, the antenna 230 is configured to work well when the device 200 is mounted against a wall or asset with a smooth surface (e.g., in a half sphere pattern, etc.) and/or (2) when the device 200 is hanging (e.g., via a tombstone bracket, etc.) with respect to a surface, etc.

The chirp rate indicates a number of times per second that an advertisement packet is send out by the device 200 (e.g., 1 beacon every two seconds, 9.5 beacons per second, 2000 millisecond (ms) chirp time, etc.). However, each additional chirp per second decreases battery life. Chirp rate is also defined by a number of channels on which the device 200 advertises (e.g., 2 channels, etc.). Transmitting on two channels instead of three can save power, for example.

The example device 200 of FIG. 2A also includes one or more clocks 270 (e.g., using a 24 MHz crystal, 32.768 kHz crystal, etc.) to support the controller 210 and radio operation via the antenna 230 and/or other interface 240 operation, for example.

The example device 200 of FIG. 2A uses LED(s) 280 to indicate status information. For example, the LED(s) 280 may indicate when the battery 260 charge of the device 200 is low, when the device 200 is connected to another device and/or is transmitting information, etc.

The example device 200 of FIG. 2A also includes one or more sensors and/or sensor interfaces 290. For example, the device 200 can include and/or be connected to one or more motion sensors, heat/infrared sensors, etc. The sensor(s) 290 can be used to "wake up" or otherwise trigger activation of the device 200 in response to a detection by the sensor(s) 290, for example.

Figure 2B:
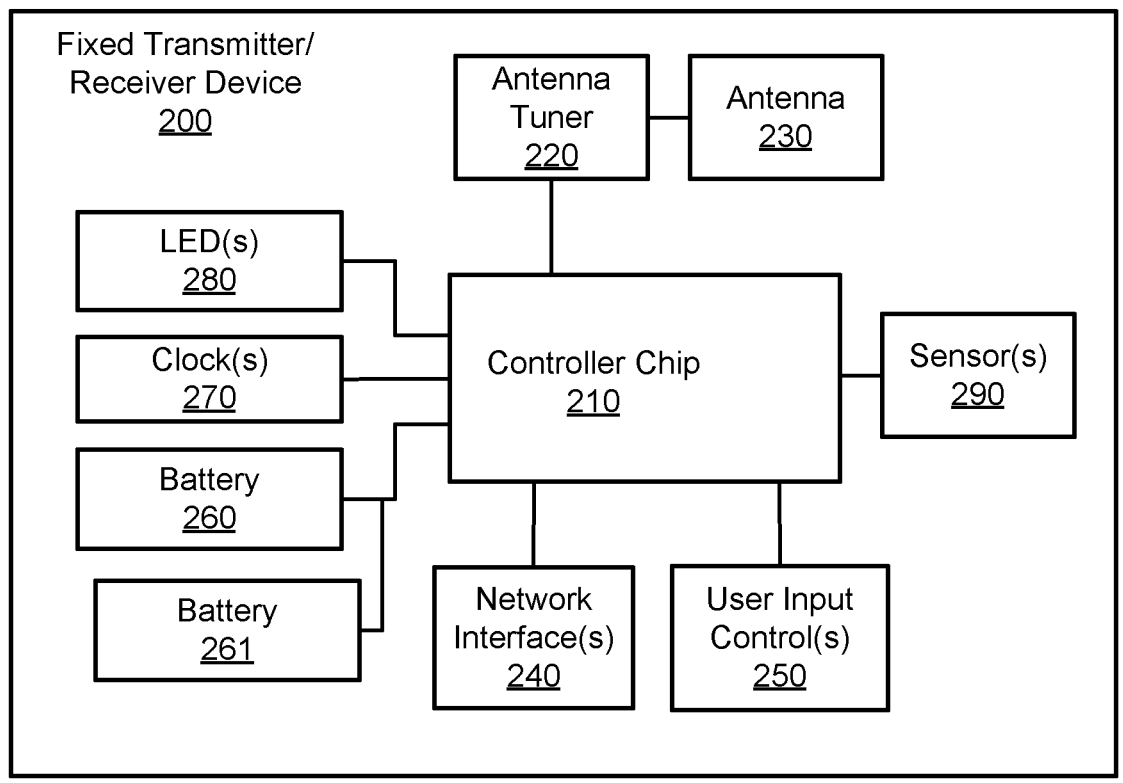

FIG. 2B is a block diagram of an alternative implementation of the example fixed, battery-powered transmitter/receiver location device 200. In the example of FIG. 2B, the device 200 includes a first battery 260 and at least a second battery 261. The batteries 260-261 can be cylindrical, circular, button, and/or coin cell batteries to power components of the device 200. The plurality of batteries 260-261 can serve as a primary battery and a secondary/backup battery to extend device 200 operating life and allow for "hot swapping" of batteries 260-261 to maintain operational power for the device 200. For example, first 260 and second 261 batteries can be removably housed in the device 200. A third battery can be in a charger such that when a charge on the first battery 260 drops below a certain threshold or level of usable battery life, the second battery 261 activates to drive operation of the device 200, for example. When a charge on the second battery 261 drops between a threshold or level of usable battery life, maintenance of the device 200 is triggered to replace the first 260 and/or second 261 battery with the third battery and/or other charged battery, for example.

In some examples, when power switches from the first battery 260 to the second battery 261, a maintenance trigger is generated by the device 200, RTLS server 155, and/or other device to replace the first battery 261 so that the device 200 remains in continuous operation with battery power. In certain examples, low power can trigger a change in operation of the device 200 (e.g., turning off Wi-Fi transmission and relying on Bluetooth communication with another nearby device 200 relay data to the server 155 rather than communicating with the server 155 and/or a gateway directly via wireless communication. Battery 260-261 replacement and/or other charging of the device 200 can trigger resumption of a normal operating mode from the lower mode, for example.

For example, transmit power has an impact on battery life. Transmit power is defined by several factors which include range/coverage and antenna design, for example. The transmit power can be adjusted to address antenna gain and coverage for a given beacon usage. The example device 200 can be designed to cover a 4 to 8 feet wide aisle with a distance between beacons 4 to 8 feet, for example. In certain examples, the antenna 230 is configured to work well when the device 200 is mounted against a wall or asset with a smooth surface (e.g., in a half sphere pattern, etc.) and/or (2) when the device 200 is hanging (e.g., via a tombstone bracket, etc.) with respect to a surface, etc.

The chirp rate indicates a number of times per second that an advertisement packet is send out by the device 200 (e.g., 1 beacon every two seconds, 9.5 beacons per second, 2000 millisecond (ms) chirp time, etc.). However, each additional chirp per second decreases battery life. Chirp rate is also defined by a number of channels on which the device 200 advertises (e.g., 2 channels, etc.). Transmitting on two channels instead of three can save power, for example.

Figure 3:
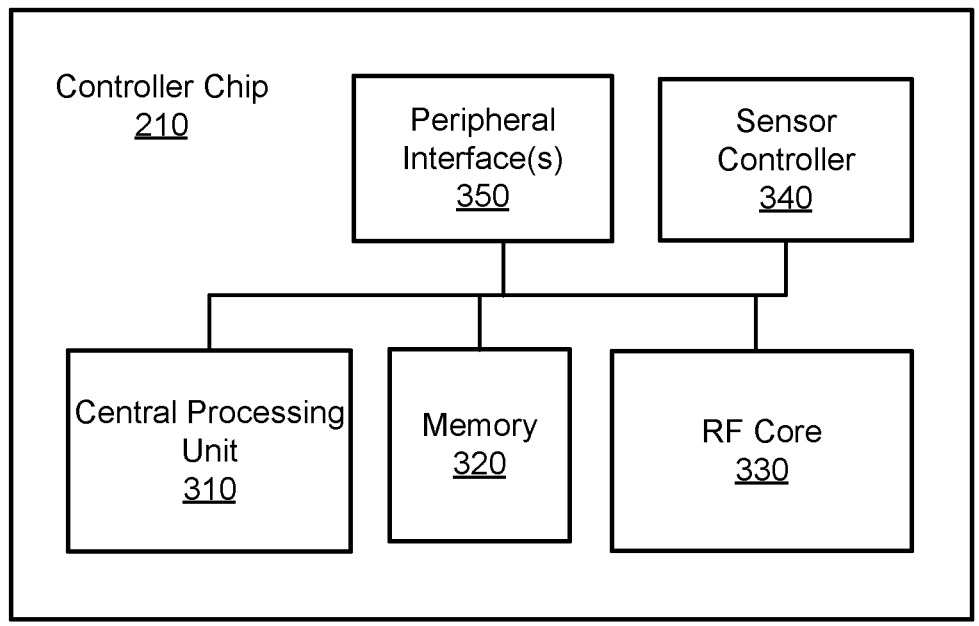
FIG. 3 illustrates an example implementation of the controller chip shown in the example of FIGS. 2A-2B.

FIG. 3 illustrates an example implementation of the controller chip 210 shown above with respect to the example of FIG. 2. As shown in FIG. 3, the controller chip 210 includes a central processing unit (CPU) 310, a memory 320, a radiofrequency (RF) communication core 330, a sensor controller 340, and one or more peripheral interfaces 350, for example.

The example CPU 310 executes instructions stored in the memory 320 to facilitate programming, testing, and operation of the controller chip 210. For example, the chip 210 implements one or more BLE profiles and/or other low-power, short-range radio frequency wireless profiles and operates the radio (e.g., RF, etc.) with the RF core 330, clock 270, antenna tuner 220, and antenna 230. The memory 320 stores information and instructions such as a BLE protocol stack, for example, for execution by the CPU 310.

The example RF core 330 controls an RF portion of the device 200 radio. For example, the RF core 330 includes a phase locked loop and/or other circuit to provide carrier and modulation frequencies to generate radio signals (e.g., 2.4 GHz, 5.2 GHz, etc.). In some examples, the clock(s) 270 operate with the RF core 330 to support RF operation (e.g., to generate a beacon signal, etc.).

The example sensor controller 340 includes and/or interfaces with the one or more sensors 290 such as a low power sensor/battery monitor, a temperature sensor, etc. The example peripheral interface(s) 350 facilitate interaction with interface(s) such as the network interface(s) 240, user input control(s) 250, temperature and/or battery monitor(s), timer(s) (e.g., watchdog timer, etc.), real time clock and/or other clock 270, security module, analog comparator, etc. In certain examples, a peripheral such as an LED and/or other light/visual indicator positioned on and/or in a housing for the device 200 can indicate whether the device 200 is turned on/off, in a particular mode, etc. For example, the device 200 can operate in one of a plurality of modes including a shipping mode, a sleep mode, a configuration mode, an operating or normal mode, etc. The indicator and/or the device 200 can act differently depending on in which mode the device 200 is operating. For example, the indication provided by the indicator can be a different color, different pattern, flashing, etc., based on the mode. Thus, the indicator reacts differently depending upon the mode of the device 200. In certain examples, the indicator can be selected to change the mode of the device 200. The device 200 can be in a shipping or sleep mode in transit, a sleep mode when idle, an operating mode to emit a signal, a configuration mode to change beacon rate, etc.

In certain examples, location devices such as the example device 200 are designed to submit event data (e.g., as JavaScript Object Notation (JSON) documents, etc.) to a service interface (e.g., a representational state transfer (REST) or RESTful service interface, etc.) at an RTLS server. There are numerous events defined, and these events can be sent in response to a condition (e.g., device regaining network connectivity, device placed on charger, device removed from charger, etc.) and/or on a time schedule that is configurable as part of the device profile. Events include a set of base (e.g., header, etc.) attributes that are used for ongoing system health management. In addition, each event includes a details section where attributes/data specific to an event type can be included, for example.

Figure 4A:
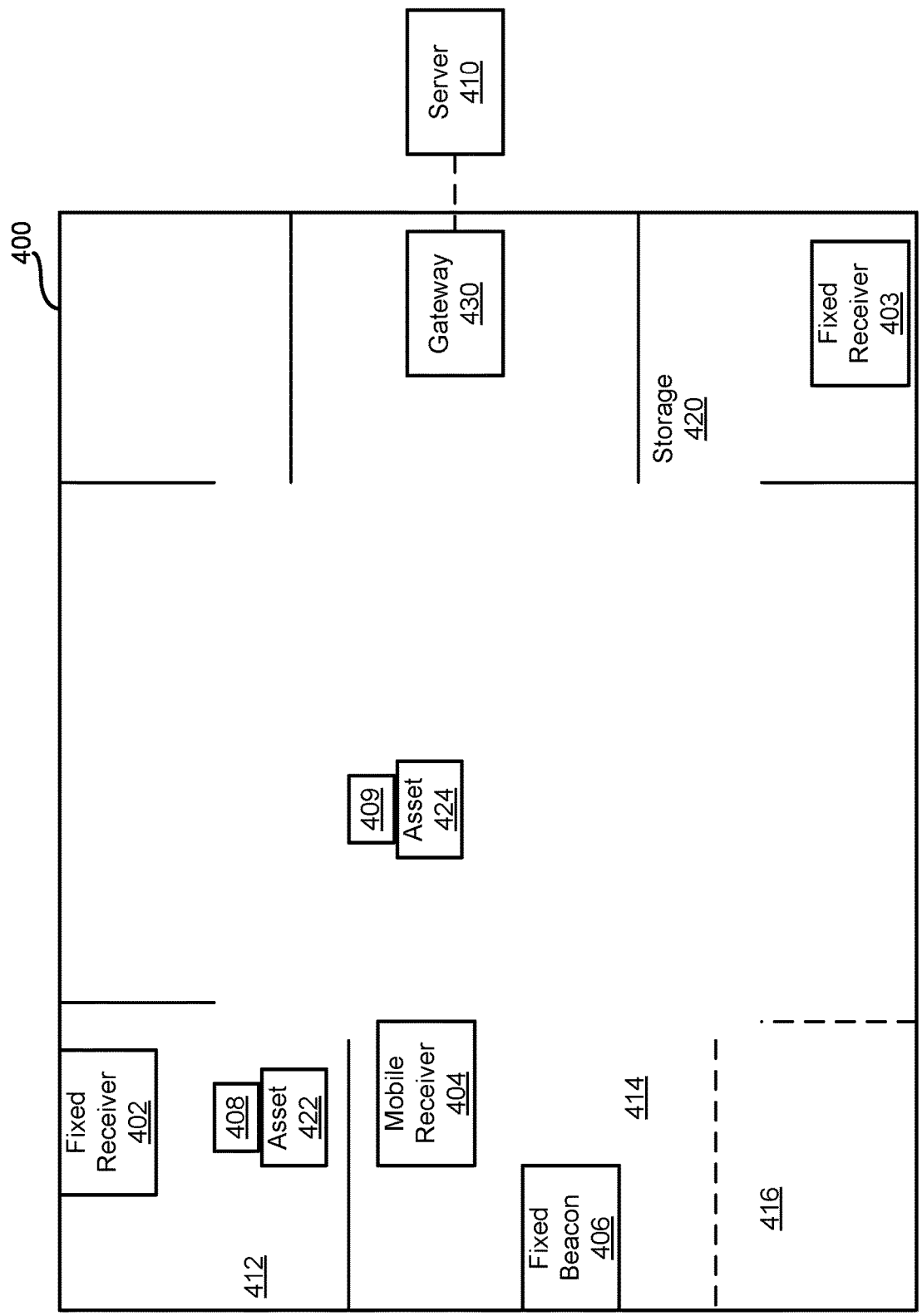
FIGS. 4A-5 illustrate example views of a healthcare environment including location devices and services.

FIG. 4A illustrates an example healthcare environment 400 (e.g., a hospital, clinic, doctor's office, etc.) including fixed receivers 402-403, a mobile receiver 404, a fixed beacon 406, mobile beacons 408-409, and a server 410. As shown in the example of FIG. 4A, various areas 412-420 of the healthcare environment 400 can be defined such as by walls, by communication range, by antenna direction, by purpose/personnel, and/or by other criterion.

In the example environment 400, the outlet-powered fixed receiver 402 is positioned (e.g., affixed to a wall and/or other structure, etc.) in a first area 412 of the environment 400. The fixed receiver 402 detects the mobile beacon 408 on a first asset 422 (e.g., a surgical cart, intravenous (IV) fluid stand, defibrillator, mobile imaging system, etc.). The other outlet-powered fixed receiver 403 is positioned in a storage area 420. The mobile receiver 404 is positioned in a second area 414 with respect to the fixed beacon 406. The mobile beacon 409 is attached to a second asset 424. Each of the receivers 402-404 detects beacon 406-409 message activity and reports location and status information to the server 410. In certain examples, communication with the server 410 can be routed through a gateway 430 and/or other edge device. In the example of FIG. 4A, the fixed receivers 402-403 must be plugged in to a power outlet and transmit frequently, and all receivers 402-404 are responsible for their own communication with the server 410.

Figure 4B:
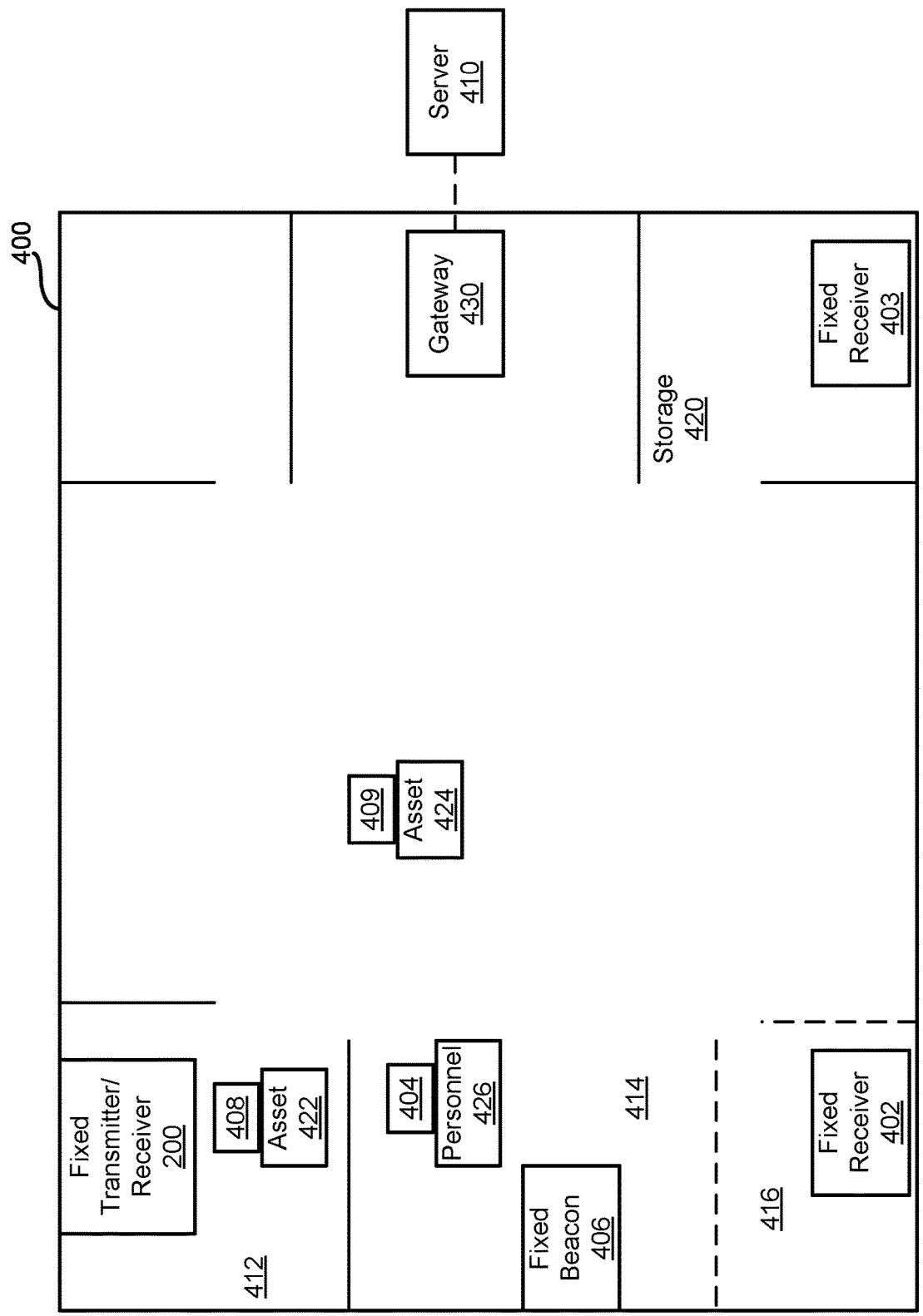

FIG. 4B illustrates another implementation/configuration of the example healthcare environment 400 (e.g., a hospital, clinic, doctor's office, etc.) including the example fixed transmitter/receiver location device 200, fixed receivers 402-403, mobile receiver 404, fixed beacon 406, mobile beacons 408-409, and the server 410. As shown in the example of FIG. 4B, the fixed transceiver device 200 is positioned (e.g., affixed to a wall and/or other structure, etc.) in the first area 412 of the environment 400 (e.g., a low-traffic area, area of infrequent movement, etc.). When awakened/activated, the device 200 detects the mobile beacon 408 on the first asset 422 (e.g., a surgical cart, intravenous (IV) fluid stand, defibrillator, gurney, mobile imaging system, etc.). The outlet-powered fixed receivers 402-403 are positioned in areas 416, 420. The mobile receiver 404 is positioned in the second area 414 with respect to the fixed beacon 406. The mobile beacon 409 is attached to the second asset 424 (e.g., a surgical cart, intravenous (IV) fluid stand, defibrillator, gurney, mobile imaging system, etc.) to enable tracking of the second asset as it moves among areas 412-420 in the environment 400.

The outlet-powered fixed receiver 402 is placed (e.g., affixed to a wall and/or other structure, etc.) in the second area 414 of the environment 400 (e.g., a high-traffic area, area of frequent movement, etc.). In certain examples, the outlet-powered fixed receiver 402 can be another device 200 taking advantage of available outlet power instead of its battery 260. The mobile receiver 404 is worn by personnel 426. The fixed beacon 406 is positioned (e.g., affixed to a wall and/or other structure, etc.) in the area 414, and the mobile beacon 408 is affixed to an asset 418 (e.g., a surgical cart, intravenous (IV) fluid stand, defibrillator, mobile imaging system, etc.) moving around the area 414.

In the example environment 400, the receivers 200, 402-404 can communicate with the RTLS server 410 (e.g., via a local and/or remote cloud-based network, etc.) to provide location data regarding personnel 426 and assets 422, 424 in the environment 400. In certain examples, the receivers 200, 402-404 can form a mesh network to communicate among themselves (e.g., crowdsource, etc.) to provide more accurate location information for one or more of the personnel 426, asset(s) 422, 424, etc. Thus, if a receiver 200, 402-404 cannot directly connect to the network, the receiver 200, 402-404 can communicate via its mesh network with another receiver 200, 402-404 proximate to its location, and data can be relayed among receiver(s) 200, 402-404 to reach the network for routing to the server 410, for example.

In certain examples, the receiver(s) 200, 402-404 can communicate with a gateway device 430 which routes communications with respect to the network. In other examples, the receiver(s) 200, 402-404 communicate directly with the network and/or directly with the server 410 (e.g., if the server 410 resides locally in the environment 400, is a local cloud-based server, etc.). In some examples, the gateway device 430 serves as an access point or relay to help facilitate communication among receivers 200, 402-404 in the environment 400.

FIG. 4C illustrates another implementation/configuration of the example healthcare environment 400. In the example of FIG. 4C, a first fixed, battery-powered transmitter/receiver device 200 and a second fixed, battery-powered transmitter/receiver device 440 are used in the example healthcare environment 400. For example, rather than the fixed beacon 406 of FIGS. 4A-4B, the area 414 can include a fixed transmitter/receiver device 440 to interact with the mobile receiver 404 and provide location information with respect to area 414. Thus, the transmitter/receiver device 200, 440 can substitute for a receiver and/or a beacon and can operate as a standalone device to provide location information and/or work in collaborative, "crowdsourced" configuration to share information with other receivers/devices to gather location data and provide location data to the server 410, for example.

Figure 5:
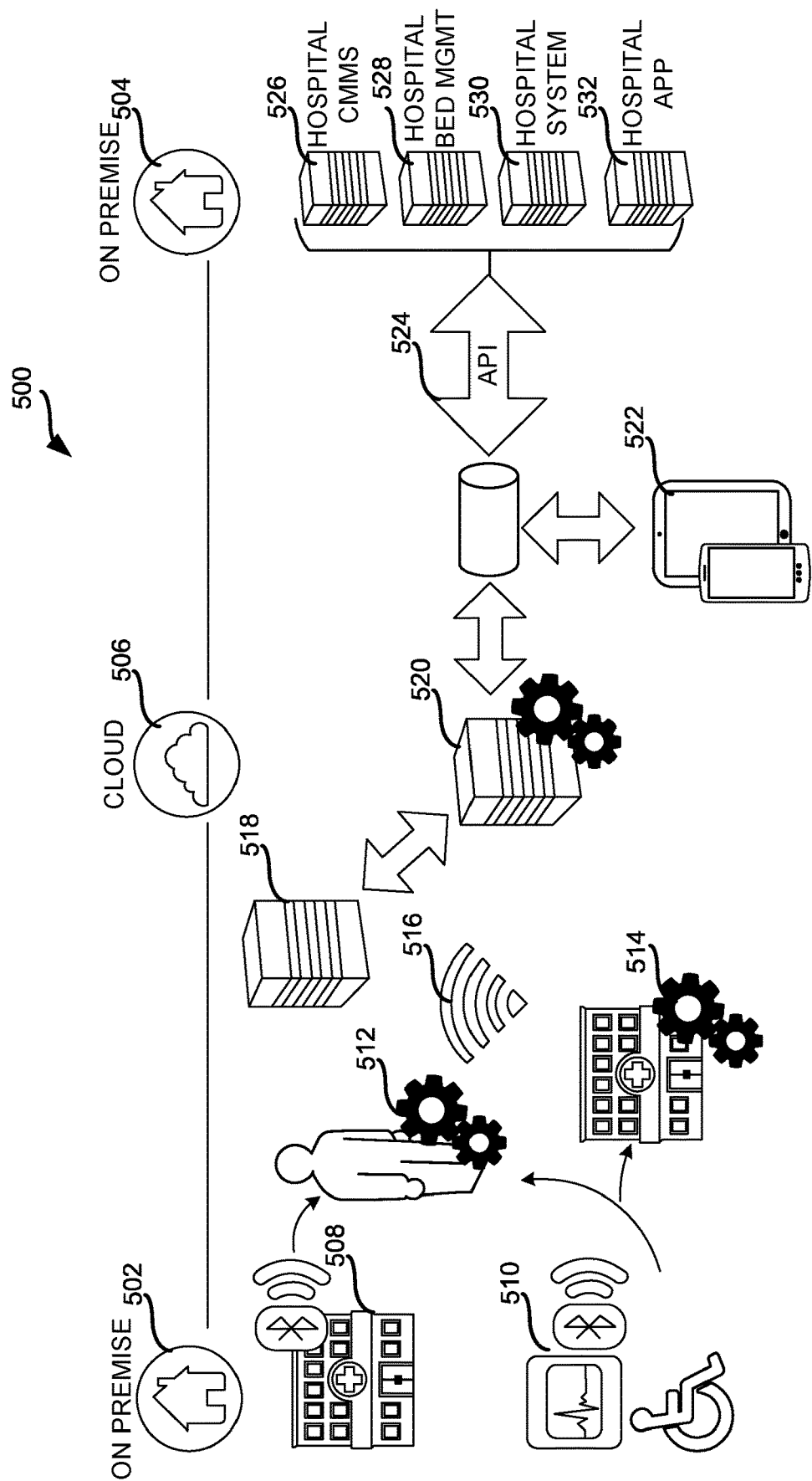

FIG. 5 illustrates another view of an example environment 500 illustrating interaction between premises 502, 504 (such as the example environment 400 of FIGS. 4A-4C, etc.) via a cloud 506. In the example of FIG. 5, one or more fixed beacons 508 and one or more mobile beacons 510 are positioned in a facility 502 (e.g., a hospital, clinic, etc.). The beacons 508, 510 are affixed (e.g., permanently affixed, removably affixed, etc.) to locations, assets, etc. For example, the fixed beacon 508 can be mounted on a wall at a location in the facility 502 at which asset(s) may be located to provide a location to a receiver (e.g., the receiver/transmitter device 200, 440 and/or other receiver 402-404, etc.). The mobile beacon 510 can be affixed (e.g., permanently, removably, etc.) to an item to be located and tracked (e.g., an intravenous (IV) pump, imaging scanner (e.g., x-ray, CT, ultrasound, etc.), crash cart, lab cart, etc.), for example.

The beacons 508, 510 are detected and read (e.g., via Bluetooth™, Bluetooth Low Energy (BLE), near field communication (NFC), etc.) by one or more mobile receivers 512 and/or fixed receivers 514 (e.g., the receiver/transmitter device 200, 440, etc.), for example. For example, the mobile receiver 512 includes logic to process its location (e.g., with respect to the fixed beacon 508, etc.). The mobile receiver 512 can be worn by a person and/or mobile asset to create a crowdsourced environment in which the mobile receiver 512 interacts with beacons 508, 510 and informs the system 500 of the receiver 512 location and presence of beacon(s) 508, 510 within range of the location, for example. The fixed receiver 514 is configured with its location in the facility 502. The fixed receiver 514 can be mounted on a wall in a location where crowdsourcing is reduced (e.g., storage locations, enclosed locations, etc.) to interact with beacons 508, 510 and inform the system 500 of the receiver 514 location and presence of beacon(s) 508, 510 within range of the location, for example. The mobile receiver(s) 512 and fixed receiver(s) 514 process which asset(s) are located within range (e.g., as indicated mobile beacon(s) 510 and/or fixed beacon(s) 508, etc.) and notify other component(s) of the system 500. The example transmitter/receiver device 200, 440 can be used to implement the fixed receiver(s), the mobile receiver(s) 512, the fixed beacon(s) 508, the mobile beacon(s) 510, etc.

The receiver(s) 512, 514 communicate over a channel 516, such as Wi-Fi, etc., with a middleware gateway 518 to transmit information regarding beacon 508, 510 location to a middleware engine 520. The middleware gateway 518 can be an edge device, gateway device, hub, and/or other electronic device to interface between the premises 502 and the cloud 506, for example. The middleware engine 520 can reside on the cloud 506 to process received beacon 508, 510 and receiver 512, 514 data and calculate location information. The middleware engine 520 can also publish location events to one or more receiving/subscribing recipients, for example.

For example, one or more consuming applications 522 access location data from the middleware engine 520 via the cloud 506 to leverage the location data for scheduling, tracking, (re)ordering, maintenance, billing, protocol compliance, treatment evaluation, employee evaluation, resource evaluation, and/or other resource management application(s), etc. Alternatively or in addition, an application programming interface (API) 524 provides location awareness data for consumption by one or more hospital applications 526-532 at a second facility (e.g., hospital, clinic, etc.) 504. For example, a hospital computerized maintenance management system (CMMS) 526, a hospital bed management system 528, and/or other hospital system 530, hospital application 532, etc., can receive and process asset location information via the API 524.

Figure 6:
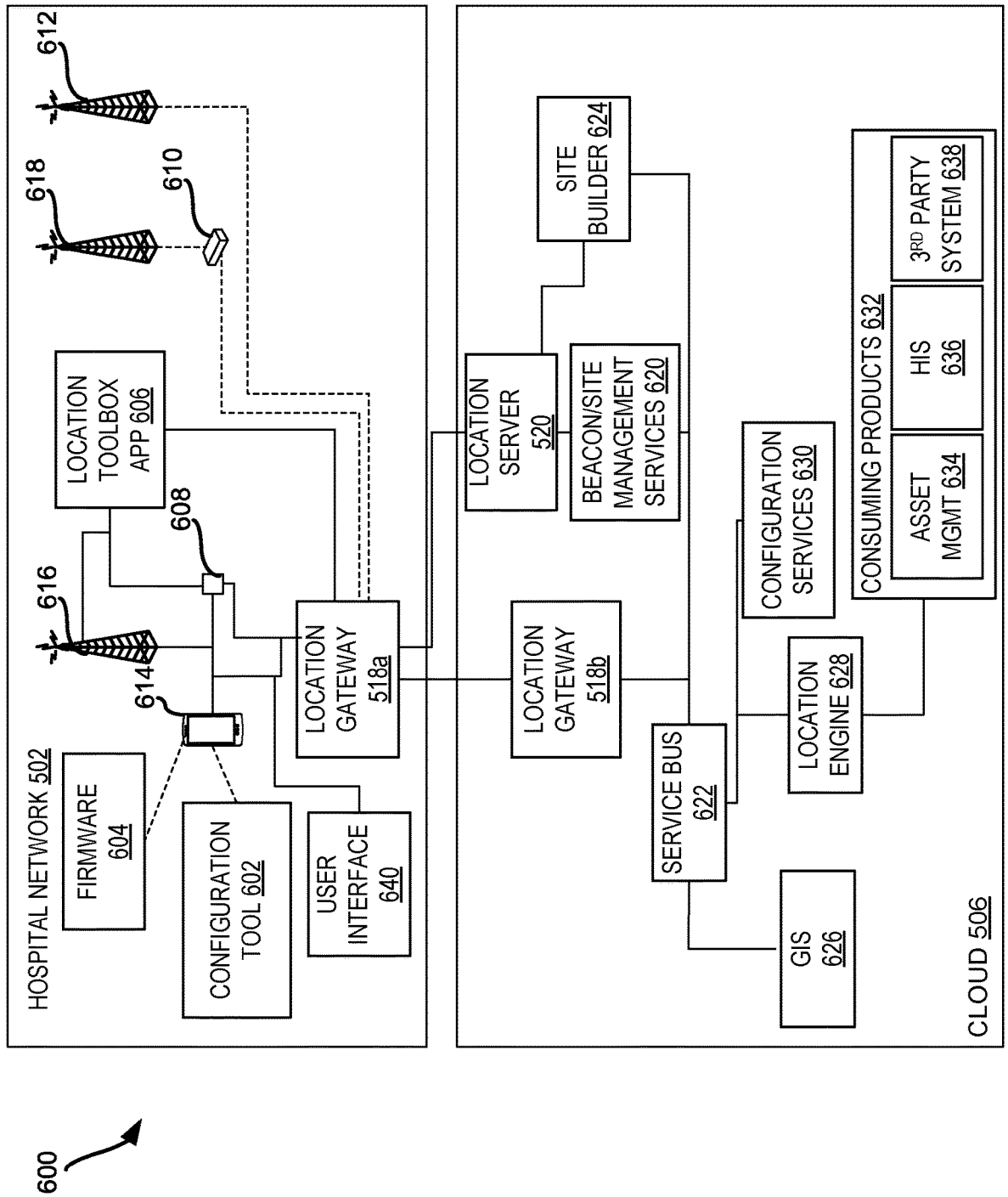
FIG. 6 illustrates an example architecture of the healthcare facility network and associated cloud infrastructure of FIG. 5.

FIG. 6 illustrates an example architecture 600 of the hospital or other facility network 502 and the cloud 506 of FIG. 5. As shown in the example of FIG. 6, the hospital network 502 communicates with the cloud 506 via the middleware or location gateway 518, which can be divided (as shown in the example of FIG. 6) into a client location gateway 518a and a server location gateway 518b. The example hospital network 502 includes a configuration tool 602 used to configure a badge 614 (e.g., a hospital staff badge, smart phone, etc.) for one or more parameters such as Wi-Fi network, gateway connectivity, gateway security credential/certificate, etc. The tool 602 can communicate with the badge 614 via Wi-Fi, Bluetooth, NFC, etc. Further, the badge 614 communicates with the client location gateway 518*a* to provide location information to the cloud 506.

Additionally, firmware 604 can communicate with the badge 614 to update firmware, settings, etc., on the badge 614. The example firmware 604 can provide and/or be associated with a software development kit (SDK) to enable integration of application(s) into the badge 614, for example. Using the SDK, the firmware 604 can provide notifications, offers, and/or other customizations to the badge 614 and/or a user/wearer of the badge 614, for example.

The example hospital network 502 of FIG. 6 also includes a location toolbox application 606, which communicates with a beacon 616 (e.g., a Bluetooth beacon, BLE beacon, etc.) and/or a hub 608 (e.g., via Bluetooth, BLE, etc.). The beacon 616 and/or hub 608 can also communicate with the badge 614 and/or the client location gateway 518*a*, for example. The toolbox 606 provides configuration and/or authorization application(s), setting(s), configuration(s), etc., for the hub 608, badge 614, and/or beacon 616, etc. For example, the toolbox 606 can be used to set beaconing frequency, beacon range, beacon transmission mode, etc. The toolbox 606, beacon 616, and/or badge 614 can communicate via the hub 608 with the client location gateway 518*a*, etc.

The example hospital network 502 of FIG. 6 can also include a reader 610 (e.g., the fixed receiver 514 such as the device 200, etc.), an access point 612, and a tag 618 (e.g., the mobile receiver 512, etc.). The Wi-Fi access point 612 helps relay locating information by presence (e.g., in the facility 502), zone (e.g., in a particular area of the facility 502), location (e.g., actual location), etc. The tag 618 and reader 610 can interact to provide location information in the hospital network 502 to the client location gateway 518*a*, for example. The configuration tool 602, toolbox 606, firmware 604, etc., can communicate with the reader 610 and/or tag 618 to update and/or configure receiver parameters such as Wi-Fi network connectivity, client gateway address, power, channel, interval, etc.

The client location gateway 518*a* communicates with the server location gateway 518*b* at the cloud 506. The client location gateway 518*a* also communicates with a middleware engine 520 such as a location server 520. The example server 520 provides a plurality of features including a management user interface (UI), a system health monitor, configuration information, insights/analytics, etc. The example server 520 communicates with beacon/site management services 620 and a site builder 624, which helps to map out a location (e.g., the hospital network environment 502, etc.) and beacons found at the location.

Using a service bus 622, the server location gateway 518*b*, beacon/site management services 620, and/or the site builder 624 can communicate with a geographic information system (GIS) 626 to create map(s) of the facility 502 to be stored using georeferenced location coordinates, for example. Fixed receivers placed in the facility 502 can be identified and added to the map using the site builder 624 and GIS 626. A location engine 628 can be used to leverage the map(s) and geographic information to associate location(s) with detected beacon events to derive a location for a particular asset, for example. Using the GIS 626 and site builder 624, maps can be modified/updated in real time (or substantially real time given some data processing, transmission, and/or storage latency, etc.) to make fast, fluid changes based on incoming data, for example. The GIS 626 provides spatial context to the inside of the facility 502 mapped by the site builder 624, for example. Using the GIS 626 platform, distance(s) between objects can be derived and georeferenced coordinates can be included. Information generated by the location engine 628 can be consumed by one or more products 632 including asset management 634, hospital information system (HIS) 636, and/or other third-party system 638, etc. Configuration services 630 can also help with badge and/or reader configuration on the server/cloud side, helping to update the configuration tool 602 at the hospital 502, for example.

In certain examples, a user interface device 640, such as a server, desktop computer, laptop computer, tablet computer, smart phone, and/or other computing device providing a graphical user interface (GUI) enables a Web-based and/or other console to be provided via the interface to one or more users. The user interface device 640 provides information, such as via a Web-based console and/or other GUI, etc., regarding connected local devices, such as beacons, badges, receivers, etc. Health status information such as heartbeat, location, MAC address and/or other device identifier (e.g., universally unique identifier (UUID), minor value, major value, etc.), firmware information, battery life, timestamp, signal strength, etc., can be viewed, interacted with, and/or otherwise modified, routed to another system/program, etc., via the user interface device 640, for example. The user interface device 640 can be a router, gateway, and/or other edge device such as gateway 518*a*, 518*b*, server 520, etc., and/or a separate device in communication with the hospital network 502 and/or cloud 506, for example.

Thus, certain examples provide systems and methods to monitor and manage badge(s), beacon(s), and receiver(s) and provide health statistics for such devices. Certain examples provide APIs that allow devices (e.g., the device 200, etc.) installed at a location to communicate status information to the cloud 506 infrastructure to be processed to display reports, analytics, facilitate interaction for repair/update, etc., to drive notifications, alerts, maintenance, etc., for system health and ongoing system operation. Certain examples facilitate monitoring and evaluation of network and system performance and retuning/reconfiguring/redefining desired network and/or system operation.

In operation, one or more way point beacons are distributed over an area (e.g., the healthcare environment 400, 502, 504, etc.) in which locationing and asset tracking is desired. Asset beacons are attached to assets such as carts, products, heart pumps, scanners, etc. A device with Wi-Fi and BLE capability such as the example transmitter/receiver device 200, can be used to detect beacon(s) and/or other receiver(s) within range.

An example way point beacon sends an advertisement packet out every chirp period (e.g., 600 ms intervals, etc.). This rate can be changed such as based on a number of chirps per second needed to resolve the location with a certain accuracy and time period. Transmit power can be a variable in the operation of the beacon. For example, way point beacons are placed at fixed locations and the location is recorded in the location server 520 in a map of the area. When the way point beacon is "heard" and/or otherwise detected by a receiver (e.g., the device 200, etc.), the location server 520 knows that the beacon is near or in the same room as the receiver reporting. The receiver can also receive beacon messages at the same time from asset beacons. The location server 520, knowing that the receiver has also heard a way point beacon, determines that the asset beacon message(s) it is receiving are located on or near assets near or in the same room as the way point beacon. Similarly, as an asset moves around in an area, wall mount receiver(s) hear the asset's beacon come into range and out of range, allowing the locationing server to track movement of the asset. Thus, a beacon can be placed on a mobile asset and used to track that asset within a user's location, for example.

Figure 7:
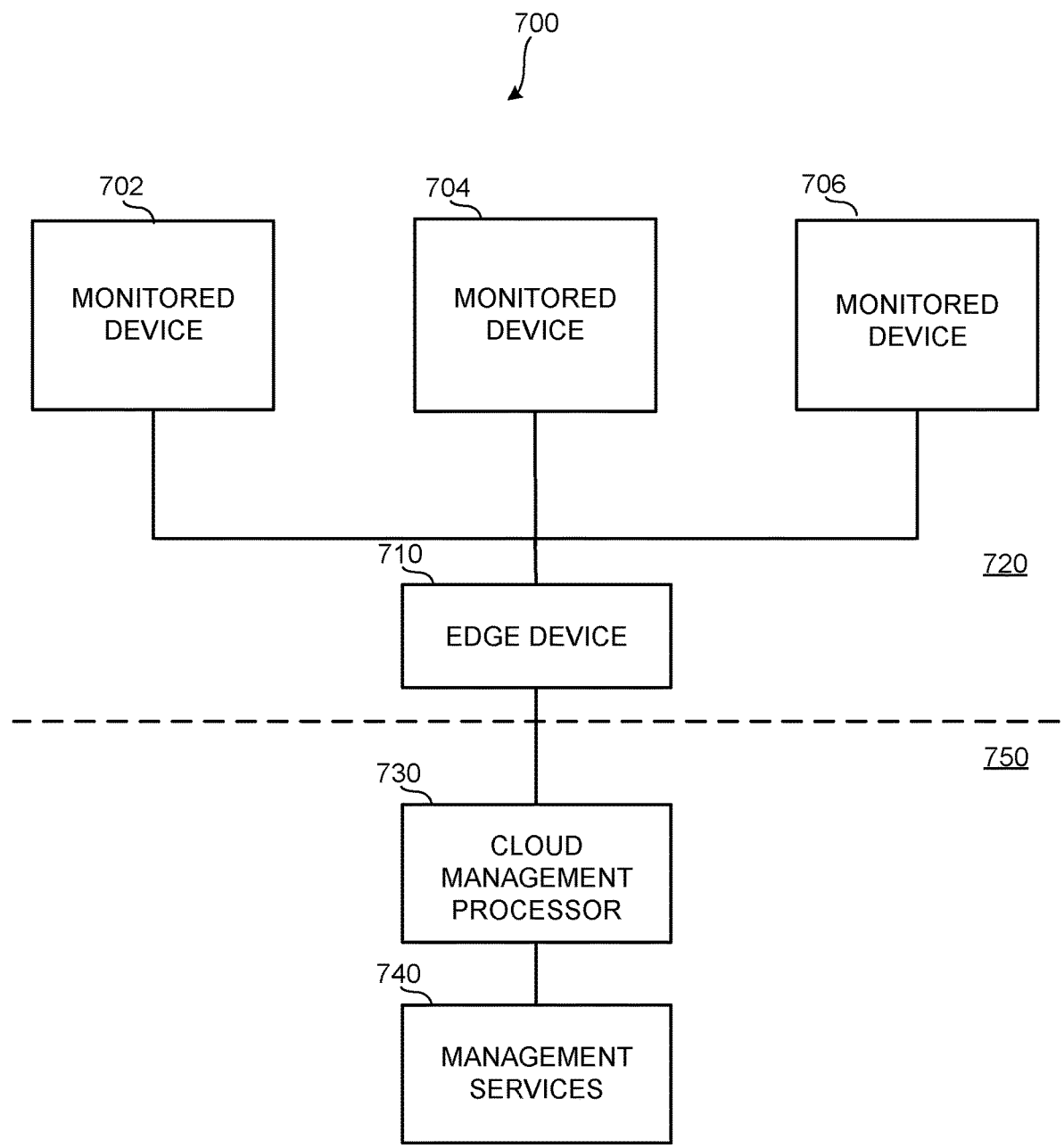
FIG. 7 illustrates an example real time location platform.

More generally, FIG. 7 illustrates an example real time location platform 700 including a number of monitoring/locating devices 702-706 and an edge device 710 in a healthcare facility 720, along with a cloud management processor 730 and management service(s) 740 in a cloud 750. The monitoring devices 702-706 can include one or more beacons, badges, and/or receivers 200, 508, 510, 512, 514, 608, 610, 612, 614, 616, 618, etc. The edge device 710 can include the location gateway 518, etc. The cloud management processor 730 can include the location server 520, etc. The management services 740 can include site management services 620, configuration services 630, etc.

The cloud management processor 730 defines a mechanism and associated API specification by which location receivers 200, 512, 514, 610 deployed as part of a real time location platform 500, 600 can transmit system health information, configuration information, location information, etc., using an event-based messaging framework. The data/events provided can be captured and utilized to maintain the system 500, 600 and help ensure optimal and/or otherwise improved performance.

In certain examples, given numerous dependencies, connectivity issues, and power concerns, the system 700 is configured such that the devices 702-706 self-report their health status, location data, and associated system events to the management processor 730 via the edge device 710 to help maintain a functional system 500, 600, 700. For example, location devices 702-706 are designed to submit event data (e.g., JSON documents, and/or other format/protocol such as XML, CSV, HTTP, JMS, SMTP, etc.) via the edge device 710 to an interface (e.g., a RESTful service interface, etc.) at or in communication with the management processor 730. In certain examples, the user interface device 640 can form part of the management processor 730 and/or be in communication with the management processor 730 to process and display device 702-706 health information.

A plurality of events can be defined. An event includes a set of base (e.g., header, etc.) attributes that are used for ongoing system health management. In addition, each event includes a details section in which attributes/data specific to an event type can be included. For example, numerous events can be defined, and these events can be sent in response to a specified condition (e.g., device regaining network connectivity, e.g., device fully charged, device near charge depletion (e.g., below a threshold level, percentage, etc.), etc.) and/or on a time schedule that is configurable as part of the device profile. The following table provides some examples of receiver health-related events:

| Event | Occurrence/Trigger |
| --- | --- |
| Charged | When a fixed transmitter/receiver device is charged |
| Low Battery | When the fixed transmitter/receiver device has low battery charge remaining |
| Forced Reboot | When the transmitter/receiver device restarts |
| Unforced Reboot/System Error | When the transmitter/receiver device restarts after a system error |
| Wi-Fi Reconnect | When the transmitter/receiver device reconnects to Wi-Fi not associated with a reboot event |
| Heartbeat | When a profile-configured time interval for communication has elapsed |

Thus, each receiver transmits health/operating details to the processor 730 via the API (e.g., API 524, etc.) when associated events are executed. In certain examples, a Wi-Fi reconnect does not include a roaming and/or access point transition for a mobile receiver. In certain examples, a heartbeat timer restarts on device reboot. In certain examples, a heartbeat interval is set to be frequent enough to monitor temperature changes, eliminating a need for temperature threshold events, for example. In certain examples, a beacon, badge, etc., can transmit similar health/operating details to the processor 730. In certain examples, a reason for reboot and/or associated error details (e.g., system error log, etc.) can be provided.

In certain examples, a service interface (e.g., API) specification can be provided, such as for a RESTful service, etc., used by device(s) 702-706 to post health events. The service interface can define a health API and/or a reference API that provides definition for location events, time, firmware updates, system health, receiver configuration, etc. For example, a location event request can be formatted as a JSON object to include a beacon MAC address, UUID, RSSI, battery life (e.g., percentage of battery life remaining, battery value, etc.), timestamp (e.g., a time at which the beacon event was received, etc.), receiver MAC address, etc. A get time request can be implemented as a JSON formatted object including a time, such as a UNIX time, POSIX time, Epoch time, UTC time, etc., for example. A firmware update can be implemented as a binary file providing an application/octet stream to a target device 702-706, for example. A system health request can be implemented, for example, as a JSON formatted object including an event type, device MAC address, timestamp, firmware version, depth of discharge (e.g., percent of battery life remaining, etc.), temperature (e.g., device temperature in Fahrenheit, Celsius, etc.), details (e.g., any additional details provided for the event), etc. A receiver configuration request can be implemented, for example, as a JSON formatted object including a scan interval (e.g., a period of time for which received beacons are being evaluated to determine which beacons should be transmitted, etc.), a scan channel (e.g., BLE channel(s) on which the device should listen, etc.), heartbeat interval, Wi-Fi transmission frequency, profile name/ID, beacon type, proximity range, RSSI low (e.g., weakest RSSI signal strength considered within the range that a beacon should be processed, etc.), RSSI high (e.g., strongest RSSI signal strength considered within the range that a beacon should be processed, etc.), beacon hit count (e.g., a number of beacon hits required to be received within a scan interval, etc.), scan retention interval (e.g., a number of scans that occur before results of a scan are stored for transmission, etc.), send closest only (e.g., if true, all beacons received within the given range will be transmitted by the device, else only the closest (e.g., highest RSSI value) beacon is to be transmitted, etc.), suppress repeats (e.g., if true, transmissions from the device will be suppressed if they are the same as the previous scan interval, etc.), time service URL (e.g., uniform resource locator exposing the time service, etc.), event service URL (e.g., uniform resource locator exposing the event service, etc.), firmware service URL (e.g., uniform resource locator exposing the firmware service, etc.), firmware filename, etc.

The quality of location data provided by the real time location platform 500, 600 is dependent on the health of the devices deployed to receive sensory/location events. If the deployed devices are not functioning as intended, the location data produced by the system has the potential to be inaccurate/unreliable. To help ensure accurate location data, support system(s) and/or team(s) (e.g., management processor 730 and management service 740) must be able to monitor system health, isolate problematic devices and correct the problems through reconfiguration, replacement, upgrade, etc. Thus, certain examples provide a centralized health and monitoring capability for large scale systems that include many thousands of devices deployed in a wide range of environments. Without this system, deployed systems would fall into disrepair over time and/or the costs of monitoring/maintaining such systems would threaten the commercial viability of the dependent products. Certain examples monitor system health and provide maintenance/solutions to enable improved system performance, higher customer satisfaction, higher return on investment for a customer, lower cost of ownership for the customer, lower support costs for a supplier, increased profit margin for the supplier, etc.

In certain examples, the user interface device 640 (e.g., executed by and/or working in conjunction with the management processor 730, etc.) provides a plurality of views showing asset status information for a facility. For example, the interface 640 provides a Web-based device health console that includes a site overview providing information for some or all RTLS devices at the site. For example, an example GUI running on the interface device 640 can provide a site overview, fixed receiver view, mobile receiver view, fixed beacon view, mobile beacon view, and/or event view, etc.

The example overview provides a health overview of the gateway 518 and/or other edge device 710 through which health information is provided by monitored device(s) 702-706. For example, connection status, data routing travel time, event throughput, etc., can be measured and reported via the example console.

The example fixed receiver view provides heartbeat, anchor location, and firmware information for fixed receivers at the site, for example. The example fixed receiver view can be used to determine whether a fixed receiver is offline and to verify that fixed receivers have the correct firmware, for example. If a receiver has not sent a heartbeat to the gateway for a certain time interval (e.g., in the past hour, etc.), the receiver will show as offline. The offline status indicates that either the receiver cannot connect to the gateway or Wi-Fi or that the receiver has been unplugged, for example.

The example mobile receiver view provides heartbeat, battery, location, and firmware information for mobile receivers at the site, for example. The mobile receiver view can be used to determine whether a mobile receiver is offline and to verify that fixed receivers have the correct firmware, for example. If a receiver has not sent a heartbeat to the gateway for a certain time interval (e.g., in the past hour, etc.), the receiver will show as offline. The offline status indicates that either the receiver cannot connect to the gateway or Wi-Fi or that the receiver is out of battery, for example. The location of the receiver represents the last place that a fixed beacon saw the mobile receiver and the last time at which the mobile receiver was seen, for example.

The example fixed beacon view provides a fixed beacon MAC address, battery life remaining, anchor location, and timestamp and address of the last mobile receiver that saw the fixed beacon. If a fixed beacon has not been detected by a mobile receiver for a certain time interval (e.g., in the past hour, etc.), the beacon will show as offline. The offline status indicates that the beacon is masked from a receiver, the beacon is out of battery, or the closest receiver is out of battery, for example. The location of the beacon represents the last place that the mobile receiver saw the fixed beacon and a timestamp at which that sighting occurred, for example.

The example mobile beacon view provides a mobile beacon MAC address, battery life remaining, timestamp and address of the last receiver to see the mobile beacon, and information regarding the location of the fixed device (e.g., fixed receiver, fixed beacon, etc.) with respect to which the mobile beacon is positioned. If a mobile beacon has not been detected for a certain time interval (e.g., in the past hour, etc.), the beacon will show as offline. The offline status indicates that the beacon is masked from a receiver, the beacon is out of battery, or the closest receiver is out of battery, for example. The location of the beacon represents the last place that the receiver saw the fixed beacon and a timestamp at which that sighting occurred, for example.

The example event view provides a sensory event history for a chosen beacon or receiver. A timestamp represents a time at which a given sensory event occurred (e.g., between a beacon and a receiver, etc.). An RSSI represents a beacon's signal strength, and a major/minor value represents the beacon major and minor of the chosen beacon, for example.

Figure 8:
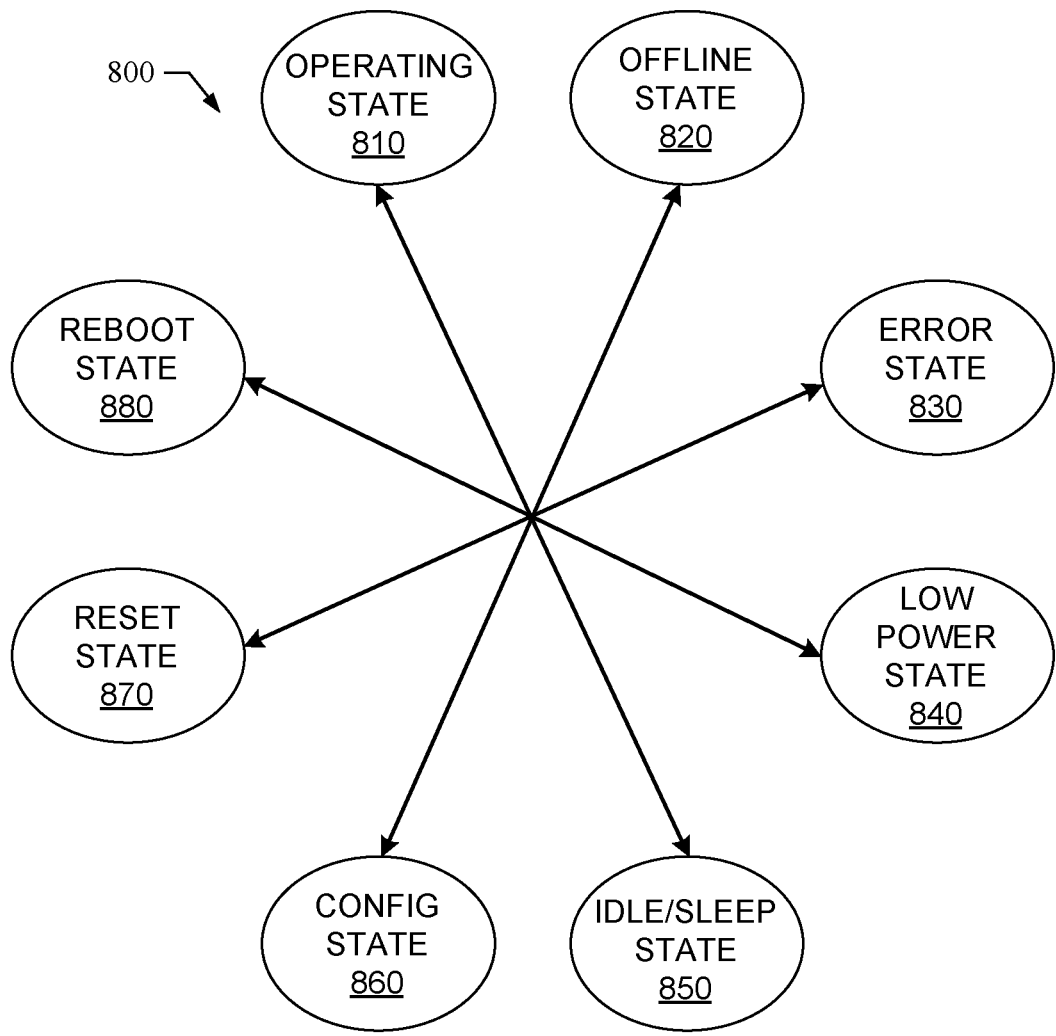
FIG. 8 illustrates an example state diagram showing transitions between states of an example transmitter/receiver device.

FIG. 8 depicts an example state diagram 800 illustrating example states or modes of a monitored device 702-706. The example state diagram 800 can be stored as a state machine to alter the memory 710 and configure the processor 730 as directed by the health monitor 720 of the device 702-706, for example. As shown in the example of FIG. 8, a plurality of states can include an operating state 810, offline state 820, error state 830, low power state 840, idle/sleep state 850, configuration state 860, reset state 870, reboot state 880, etc. The monitored device 702-706 can transition among states 810-880 according to the example state machine 800.

For example, the monitored device 702-706 can transition to the operating state 810 (also referred to as a broadcasting state or broadcasting mode) 810 when operating normally according to its configuration. The monitored device 702-706 can transition to the offline state 820 when the device 702-706 cannot find a network connection (e.g., to a gateway, Wi-Fi, to another device 702-706 via mesh network connection, etc.), for example. The monitored device 702-706 can transition to the error state 830 when it detects a problem with its operation, an issue/error outside its defined states, etc. The monitored device 702-706 can transition to the low power state 840 when the battery of the device 702-706, available wall outlet power, etc., is running low on power (e.g., below a defined battery level/threshold, etc.), for example. Transition to the low power state 840 can trigger an information message to the server 410, 52, 703 for maintenance of the device 702-706 and/or its battery until maintenance/charging/replacement of the battery occurs, for example. The monitored device 702-706 can begin in and/or transition into the idle state 850 (also referred to as a sleep state or shipping mode, etc.) when it is packaged and shipped to a customer, when it has not detected any activity for a certain time interval, etc.

The monitored device 702-706 can transition into the configuration state 860 when the monitored device 702-706 is being configured and/or otherwise set up in its configuration mode. For example, a technician can set up the monitored device 702-706 in configuration mode. The management processor 730, gateway 518 (e.g., 518a and/or 518b, etc.), another device 502-506, etc., can trigger the configuration state 860 at the monitored device 702-706 to adjust parameter(s)/setting(s) of the device 702-706, for example.

The monitored device 702-706 can transition into the reset state 870 when instructed to reset its settings to its default settings, for example. For example, a technician, management processor 730, gateway 518, another device 702-706, etc., can trigger the reset state 870 to reset the monitored device 702-706 to its factory default. The monitored device 702-706 can transition into the reboot state 880 when a reboot is triggered for the device 702-706 (e.g., by a technician, management processor 730, gateway 518, another device 702-706, etc.), for example.

Figure 9:
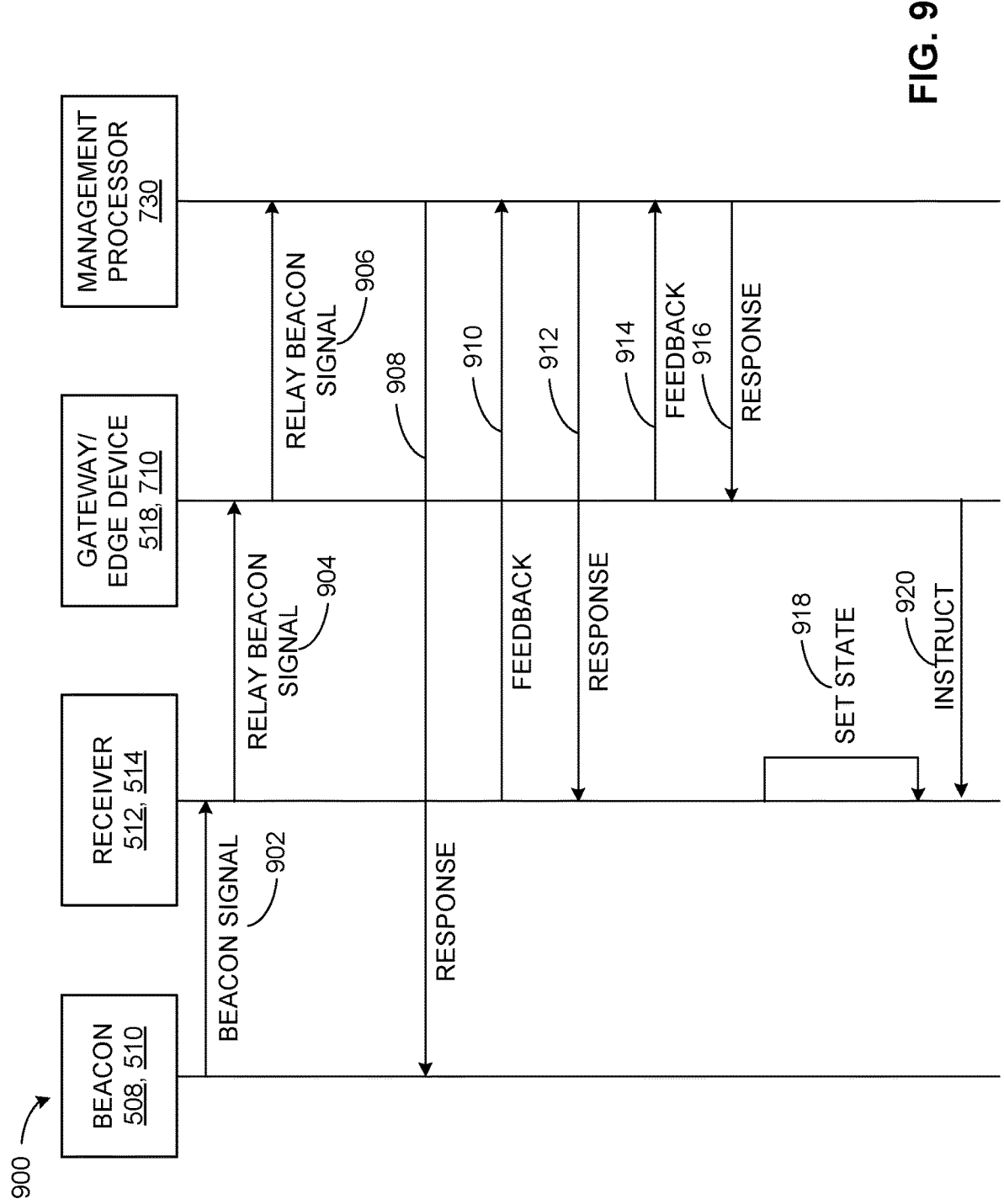
FIGS. 9-10 depict example data flows involving receivers such as the example fixed transmitter/receiver device of FIGS. 2A-2B.

FIG. 9 shows an example data flow 900 between a beacon (e.g., a fixed 508 or mobile beacon 510, etc.), a receiver (e.g., a fixed 514 or mobile receiver 512, etc.), and the cloud management processor 530 via the gateway 518. At 902, the beacon 508, 510 provides a signal (e.g., a heartbeat, a ping, a status signal, etc.) within its range. For example, the beacon 508, 510 broadcasts a signal in its communication range to identify itself and provide its status.

At 904, the receiver 512, 514 relays the beacon signal to the gateway 518/edge device 710. For example, the receiver 512, 514 receives the beacon signal when in range of the beacon 508, 510 and packages information from the received beacon signal and generates a communication for the gateway 518/edge device 710.

In certain examples, the gateway 518/edge device 710 can process and react to the beacon signal data from the receiver 512, 514 (e.g., by logging the beacon signal data, generating a response (e.g., configuration, reset, reboot, error, acknowledgement, etc.) to return to the receiver 512, 514 (and/or through the receiver 512, 514 to the beacon 508, 510). In other examples, at 906, the gateway 518/edge device 710 relays the information message from the receiver 512, 514 to the management processor 730. At 908, the management processor 730 generates a response (e.g., configuration, reset, reboot, error, acknowledgement, etc.) to return, via the gateway 518/edge device 710, to the receiver 612, 614 (and/or through the receiver 512, 514 to the beacon 608, 610).

At 910, if the receiver 512, 514 receives no beacon signal, then the receiver 512, 514 provides feedback to the gateway 518/edge device 710 to be routed to the management processor 730 regarding the missing/unavailable/offline/erroring beacon 508, 510, for example. At 912, the cloud-based management processor 730 (and/or its gateway 518/edge device 710, etc.) can log the information and generate a response (e.g., to the receiver 512, 514, to the gateway 518/edge device 710, to the beacon 508, 510, to a service request, etc.).

At 914, if the gateway 518/edge device 710 receives no receiver communication, then the gateway 518/edge device 710 to can trigger a response and/or send an alert to the management processor 730 regarding the missing/unavailable/offline/erroring receiver 512, 514, for example. At 916, the management processor 730 (and/or its gateway 518/edge device 710, etc.) can log the information and generate a response (e.g., to the receiver 512, 514, to the gateway 518/edge device 710, to a service request, etc.).

At 918, if the receiver 512, 514 receives no gateway/edge device communication, then the receiver 512, 514 can enter an offline 820 or error 830 state, for example, until, at 920, receiving an instruction such as a reset, reboot, heartbeat communication from the gateway 518/edge device 710, etc.

Figure 10:
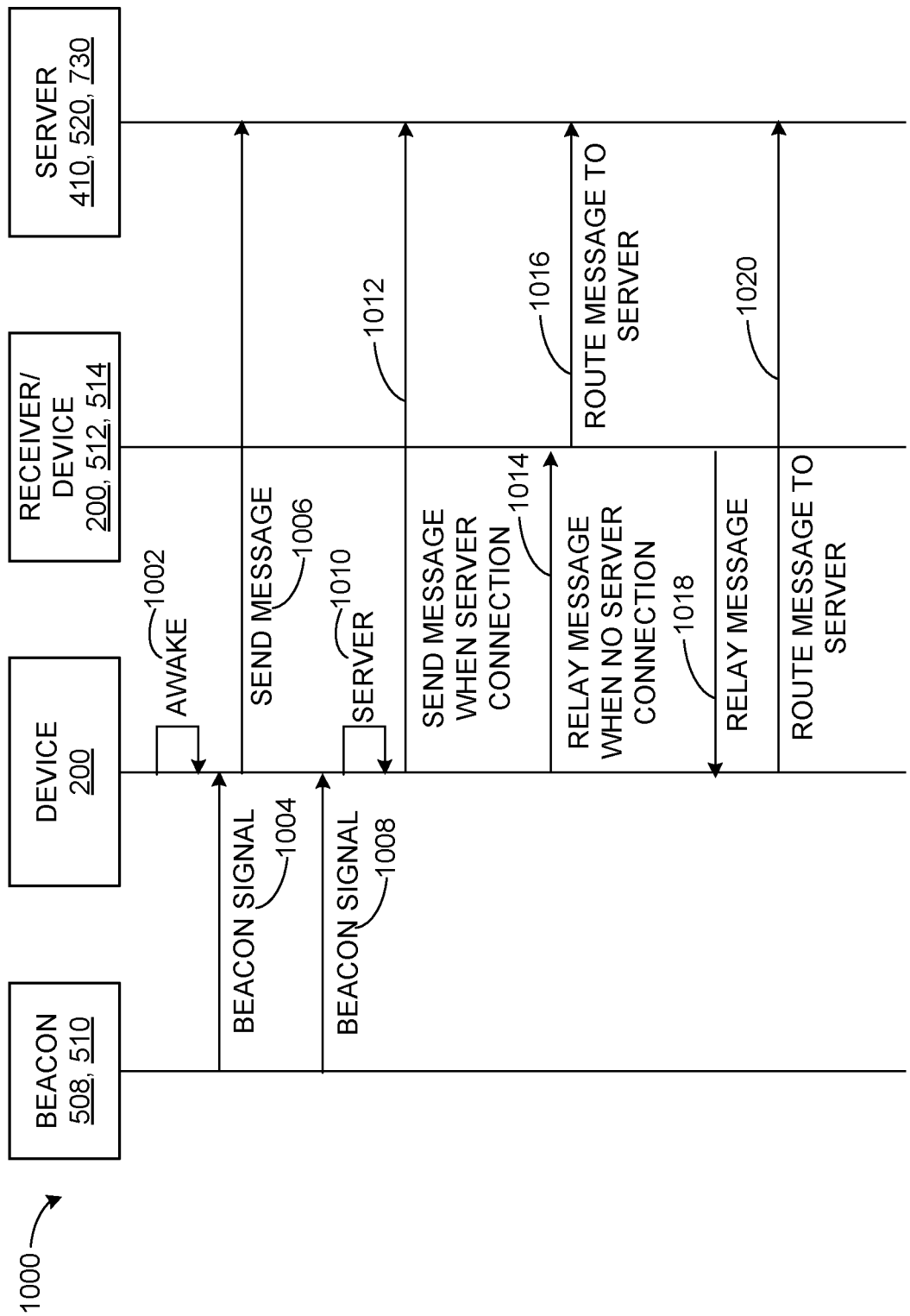

FIG. 10 shows an example data flow 1000 between the fixed transmitter/receiver location device 200, other receiver(s)/device(s) 200, 402-404, 440, 512, 514, and the server 410, 520, 730. At 1002, the example device 200 is awaken/activated. For example, the device is activated after a period of inactivity (e.g., from in a sleep or idle mode to an operating, transmit or broadcast mode, etc.) based on a defined time interval, detection of motion, receipt of a beacon message, etc. At 1004, presence of a first asset is detected at a first location based on a first message from a first beacon 406, 408-409, 508, 510 associated with the first asset. For example, the device 200 is awakened and detects a heartbeat message from the first beacon 406, 408-409, 508, 510 located in a room and/or other area with the device 200 and associated with the first asset such as a patient bed, monitor, imaging system, etc.

At 1006, a second message (an information message) including location information regarding the first asset is communicated to the server 410, 520, 730. For example, the device 200 sends a message to the server 410, 520, 730 including information regarding the location of the first asset based on the first beacon message, information regarding a health (e.g., battery life/power status, etc.) of the device 200, etc.

At 1008, movement of a second asset is detected based on a third message from a second beacon 408-409, 510 associated with the second asset. For example, a second asset, such as a cart, IV stand, oxygen tank, ventilator, portable imaging system, gurney, etc., is detected by the device 200 based on the second message from a mobile beacon 408-409, 510 attached to the second asset.

At 1010, the server 410, 520, 730 is located. For example, the device 200 determines whether or not it has a connection with and/or can otherwise detect the server 410, 520, 730 to send data to the server 410, 520, 730. At 1012, when the device 200 is able to communicate with the server 410, 520, 730, the device 200 sends a fourth message (an information message) to the server 410, 520, 730 including location information regarding the second asset. At 1014, when the device 200 is unable to communicate with the server 410, 520, 730, the device 200 routes a fifth message including location information regarding the second asset to another receiver/device 200, 402-404, 512, 514 to relay, at 1016, the location information to the server 410, 520, 730.

At 1018, the device 200 receives a sixth message from another receiver 200, 402-404, 440, 512, 514 with information to be relayed to the server 410, 520, 730. At 1020, the device 200 communicates the information to the server 410, 520, 730 on behalf of the other device 200, 402-404, 440, 512, 514 in a seventh message.

Figure 11:
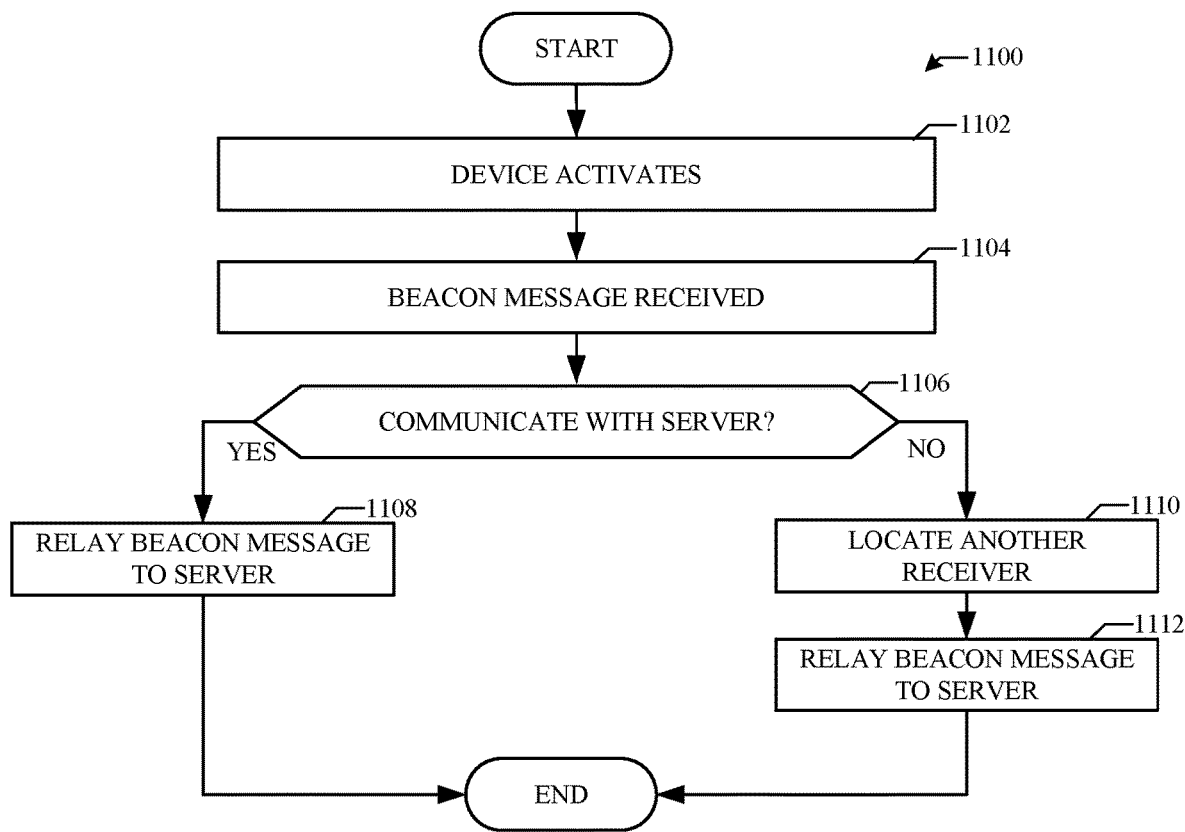
FIGS. 11-13 illustrate flowcharts of example operation using the example fixed transmitter/receiver device of FIGS. 2A-2B.

FIG. 11 illustrates a flowchart of an example method 1100 to operate location services using the example fixed transmitter/receiver device 200. At block 1102, the example device 200 is awaken/activated. For example, the device 200 is activated after a period of inactivity (e.g., from in a sleep or idle mode to an operating, transmit or broadcast mode, etc.) based on a defined time interval, detection of motion, receipt of a beacon message, etc.

At block 1104, a beacon message is received. The beacon message can be received from a fixed or mobile beacon 406, 408-409, 508, 510 and from a receiver and/or other device 200, 402-404, 512, 514, for example. The beacon message includes information regarding location and/or status of a beacon 406, 408-409, 508, 510 and can by used by the device 200 and/or the server 410, 520, 730 to determine the location of an asset associated with the beacon 406, 408-409, 508, 510. In some examples, the beacon message is sent directly by the beacon 406, 408-409, 508, 510. In other examples, the beacon message is relayed by the receiver/device 200, 402-404, 440, 512, 514 (e.g., via a receiver mesh network when the receiver 200, 402-404, 440, 512, 514 cannot communicate with the server 410, 520, 730).

At block 1106, the device 200 evaluates whether it can communicate with the server 410, 520, 730. For examples, the device 200 determines whether it has a connection to and/or is otherwise within communication range of the server 410, 520, 730 (e.g., wirelessly direct or via the gateway/edge device 518, 710, etc.). If the device 200 can communicate with the server 410, 520, 730, then, at block 1108, the beacon message is relayed to the server 410, 520, 730 by the device 200 (e.g., directly and/or via the gateway/edge device 430, 518, 710, etc.).

However, if the device 200 cannot communicate with the server 410, 520, 730, then, at block 1110, the device 200 locates another receiver/device 200, 402-404, 440, 512, 514 that can relay information to the server 410, 520, 730. At block 1112, the other receiver/device 200, 402-404, 440, 512, 514 sends a message to the server 410, 520, 730 (e.g., directly and/or via the gateway/edge device 430, 518, 710, etc.) including the information relayed by the device 200 to that receiver/device 200, 402-404, 440, 512, 514. The information message can include the beacon message, device 200 status information, etc. For example, if the device 200 does not have sufficient battery power remaining to communicate directly with the server 410, 520, 730 and, instead, must route its data through the other receiver/device 200, 402-404, 440, 512, 514, that information can be conveyed to the server 410, 520, 730 such as to trigger maintenance and/or flag the device 200. Thus, the receivers/devices 200, 402-404, 440, 512, 514 can form a mesh network and/or other smart/intelligent inter-device network for secure, reliable, and efficient communication of location and status information to the server 410, 520, 730.

Figure 12:
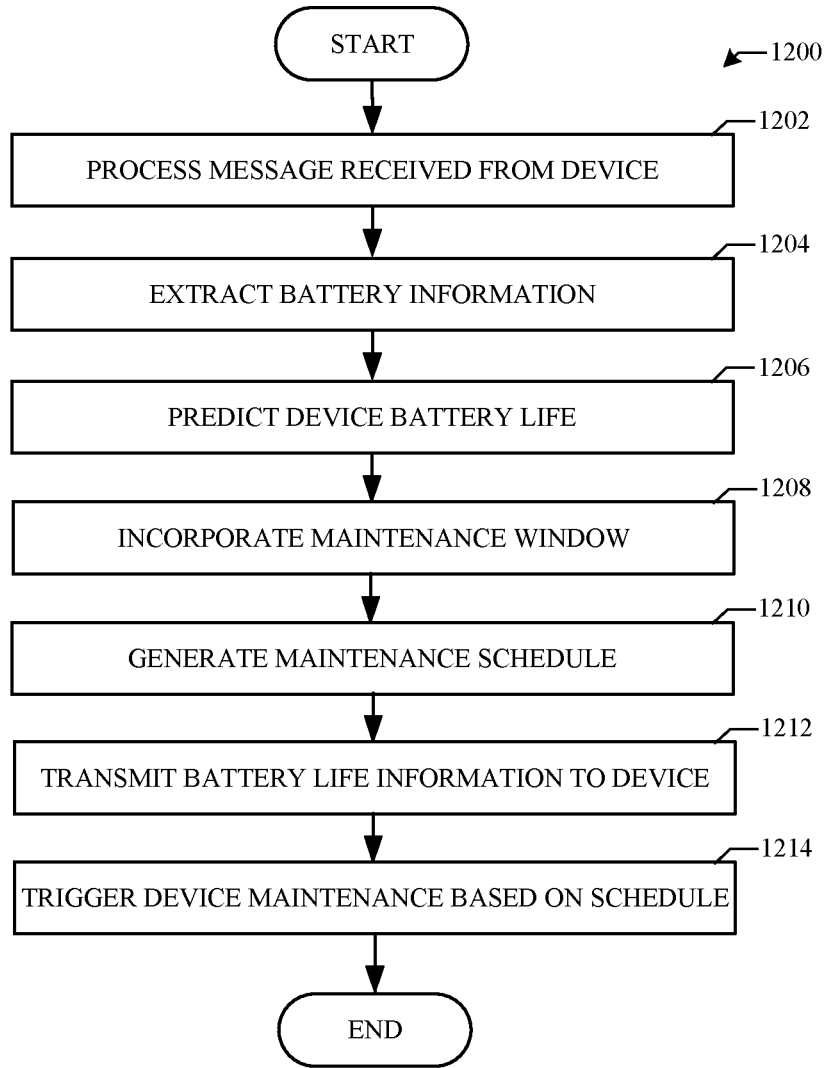

FIG. 12 illustrates a flowchart of an example method 1200 to monitor and manage battery life/health and maintenance of the example fixed transmitter/receiver device 200. At block 1202, the server 410, 520, 730 processes a message received from the transmitter/receiver device 200. The message includes location information from a beacon 508, 510, as well as identification information for the device 200 and health information such as device 200 state/mode, battery life/health data, etc. At block 1204, battery information is extracted from the message to determine battery level for the device 200. The server 410, 520, 730 extracts the battery level/status data from a field in the message (e.g., reader message 130, etc.) received from the device 200, for example.

At block 1206, the server 410, 520, 730 predicts battery life for the device 200. For example, the server 410, 520, 730 compares the battery level/status information with historical battery data to determine a likely/probable battery life remaining for the device 200. In certain examples, a state/mode of the device 200 (e.g., operating 810 versus idle 850 versus low power 840, etc.) impacts a determination of battery life as the state corresponds to certain power usage by components of the device 200, etc. At block 1208, a maintenance window or time period to allow for recharging and/or replacement of the battery 260 is factored into the expected battery life. For example, the server 410, 520, 730 determines an expected time until battery 260 replacement and/or device 200 recharging and uses that time to determine a maintenance window or allowable period of time for recharging/replacement. The estimated/expected battery life is modified (e.g., reduced) to account for the maintenance window for recharging/replacement so the device 200 does not cease operation unexpectedly for lack of power, for example.

At block 1210, a maintenance schedule/timetable is generated for the device 200 based on the estimated battery life. For example, the server 410, 520, 730 determines how much battery life likely remains for the device 200, including the maintenance window, and determines a maintenance timetable of tasks, durations, and/or other timing to recharge and/or replace the battery 260 for the device 200 (e.g., recharge/replace a primary and/or second battery 260 in the device 200, etc.). The maintenance schedule and/or other health/battery information can be provided to a third-party enterprise messaging system/service, for example. At block 1212, battery life and/or maintenance information is transmitted to the device 200. The device 200 can then process the information to determine a change in state 800 (e.g., a switch from the operating state 810 to the lower power state 840, a transition from a primary battery to a secondary battery 260, a switch to the configuration state 860, a shutdown of certain device 200 functionality such as Wi-Fi communication in favor of BLE communication with other receiver(s)/device(s), etc.).

Figure 13:
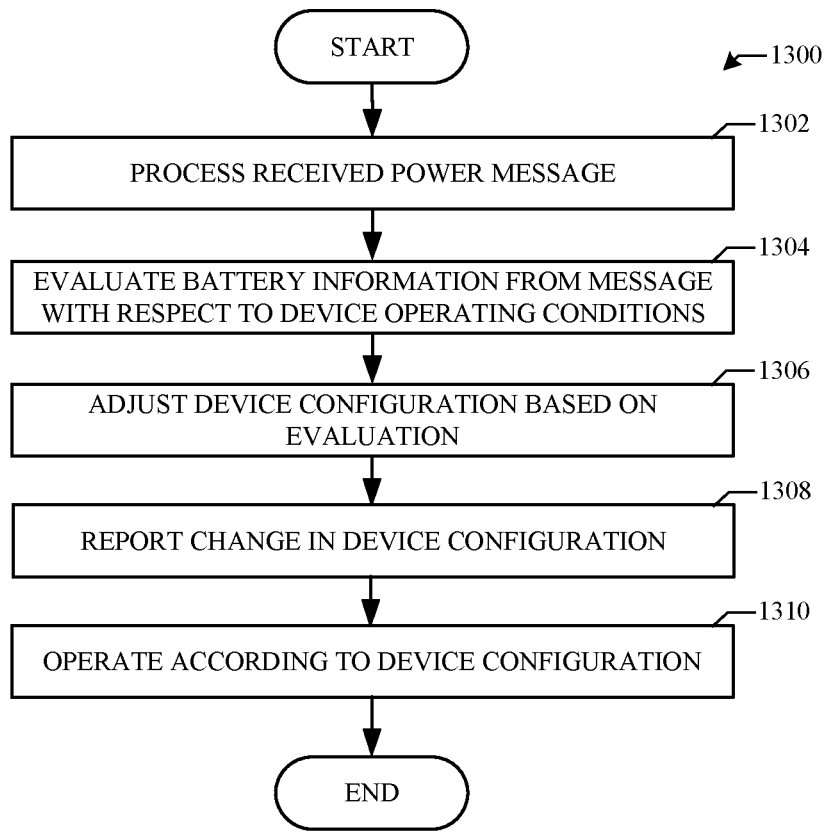

FIG. 13 illustrates a flowchart of an example method 1300 to adjust transmitter/receiver device 200 operation based on battery/health information. At block 1302, a received power message is processed by the device 200. For example, the device 200 receives an instruction message from the server 410, 520, 730 (e.g., directly or via gateway/edge device 430, 518, 710 include an instruction and/or configuration setting change for the device 200, and the device 200 processes the message to extract the instruction/configuration setting information, such as battery information.

At block 1304, the device 200 evaluates battery information from the message with respect to operating conditions for the device 200. For example, an indication of expected battery life remaining provided by the server 410, 520, 730 in the message can be compared with a current state 800 of the device 200, which can correspond to its level of activity such as broadcasting location information, sitting idle, being configured, in an error state, etc. The current state 800 of the device 200 can dictate a level of operation of the device 200 necessary or warranted to sustain operation in the state 800. For example, if the device 200 is in the operating state 810 and no other receiver 200, 402-404, 440, 512, 514 is within range, the device 200 must have sufficient power to communicate location data to the server 410, 520, 730 via Wi-Fi and/or other wireless connection. However, if the device 200 is in the operating state 810 and another receiver 200, 402-404, 440, 512, 514 is within range, the device 200 can deactivate its high-power Wi-Fi communication interface to save power and use low-power Bluetooth communication to route location and/or other data to the other receiver/device 200, 402-404, 440, 512, 514, which can relay that information to the server 410, 520, 730 on behalf of the device 200, for example.

At block 1306, a configuration of the device 200 is adjusted based on evaluation of battery information with respect to operating conditions. For example, the state 800 of the device 200 can change, a portion (e.g., the Wi-Fi transmitter, etc.) of the device 200 can be deactivated/activated, a frequency/interval/period of communication by the device 200 can be adjusted (e.g., increased, decreased, etc.), a backup battery can be activated, etc., based on how the battery level/predicted battery life matches the demands and/or other operating conditions being placed on the device 200.

At block 1308, the change in device configuration can be reported back to the server 410, 520, 730 and/or third-party messaging system, etc., to confirm the change and allow the server 410, 520, 730 to track and manage device 200 health, management, and maintenance. For example, the change in device configuration can trigger recharging of a replacement battery, scheduling of a maintenance tasks, etc., based on the change in device configuration. At block 1310, the device 200 operates according to the adjusted device configuration. For example, the device 200 can begin relaying messages to another receiver/device 200, 402-404, 440, 512, 514 via Bluetooth, or the device 200 can resume communicating with the gateway 430, 518, 710 and the server 410, 520, 730 via Wi-Fi, etc., based on the device configuration.

Thus, certain examples provide real time location service devices, apparatus, systems, methods, and articles of manufacture to optimize and/or otherwise improve communication, adaptability, and battery life of receiver devices over prior devices. Certain examples provide improved configurability of different operating conditions, tasks, applications, etc., in receiver devices over prior devices. Certain examples provide improved power management over prior receiver devices. Certain examples enable a fixed receiver to be a fixed transmitter/receiver device and to relay communication from other devices as well as respond to beacon messages to provide location information to a server for real time location services in a healthcare environment.

Certain examples overcome battery management problems by predicting battery life based on device usage, battery threshold, and/or other operating conditions. Certain examples overcome device management and communication problems by providing a fixed transmitter/receiver location device that can change state/mode such as between idle, lower power, and normal operating state based on usage, battery level, and/or other operating/environment conditions. Certain examples facilitate seamless maintenance of such devices through rotating battery charging, battery backup, change in device operating state, and automated maintenance schedules.

Certain examples provide a hybrid location device that can be fixed and/or mobile, battery-powered and/or outlet-powered. Certain examples provide a device that can operate as a standalone beacon message receiver and participate in crowdsourcing (e.g., relaying messages for crowdsourced routing and/or serving as a routing point for relayed messages, etc.). Certain examples provide dynamic network management between fixed and mobile beacons and fixed and mobile receivers including one or more transmitter/receiver location devices.

In contrast to prior fixed receivers which were activated and on the time to react to moving assets, certain examples provide fixed, hybrid transmitter/receiver devices with adjustable operating states responsive to trigger(s) to prolong battery life and adaptively shift among idle, low power, and normal operating states based on available battery power, environment conditions, and other operating conditions. Certain examples can crowdsource, if warranted, or operate alone and provide plug-and-play operability in a variety of healthcare environments. Additionally, rather than omni-directional antennas gathering interference and/or other inaccurate measurement from an adjacent room, certain examples provide directional (e.g., forward-facing) antennas for improved, targeted directional measurement.

Certain examples provide outcome-configurable location systems and methods. Example devices can be configurable by outcome so a system (e.g., a locationing server, etc.) can understand the outcome and configure a rate of communication and beacon message exchange to attain a desired outcome (e.g., asset tracking, maintenance scheduling, protocol adherence, etc.). The outcome can also drive maintenance with hot-swappable batteries to reduce, minimize or eliminate network/system downtime. Maintenance scheduling for location devices and battery swapping can vary based on location, application, etc. Thus, a desired outcome drives a frequency and/or other pattern of communication, and the frequency/pattern of communication drives maintenance to swap batteries and/or dictate power usage by the device. Knowledge/prediction/estimation of battery life and time till battery death can be updated as data is received in information messages from a location device with a battery-remaining indictor in the message. Receiver health systems and methods can be leveraged with battery level/life information, and a maintenance window dictating battery replacement can be provided. Data, instructions, status, maintenance schedule, etc., can be provided in message data payloads, for example. Certain examples provide system health monitoring via a cloud-enabled server and associated edge device(s) serving as communication gateways for individual facilities and multi-facility installations.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A device to be affixed to a surface, the device comprising:
   a network interface to enable transmission and receipt of messages via a first communication medium and transmission and receipt of messages via a second communication medium, the network interface to form a smart network with at least one of a receiver or a second device, the smart network to facilitate relay of messages to at least one of a receiver or a second device to be routed to a server; and
   a processor to at least:
      process a beacon message received via the network interface;
      generate an information message for the server based on location information from the beacon message and status information; and
      when a battery level of the device is below a battery threshold, deactivate the first communication medium in the network interface and relay the information message via the smart network to at least one of the receiver or the second device to be routed to the server.

2. The device of claim 1, wherein the smart network includes a mesh network.

3. The device of claim 1, further including a directional antenna to detect the beacon message in a coverage area to be formed by the antenna.

4. The device of claim 1, further including a sensor to trigger the device into an operating state from an idle state.

5. The device of claim 1, wherein the first communication medium includes Wi-Fi communication and wherein the second communication medium includes Bluetooth Low Energy (BLE) communication.

6. The device of claim 1, wherein the processor is to relay the information message to at least one of the receiver or the second device when the network interface is unable to communicate with the server.

7. The device of claim 1, further including a first battery and a second battery, the second battery to be activated by the processor to power the device when the battery level of the first battery falls below a threshold.

8. The device of claim 1, wherein the location information is to be determined using the beacon message and at least one of the receiver or the second device via the smart network.

9. The device of claim 1, wherein the processor is to adjust an operating state of the device based on the battery level and a maintenance schedule provided by the server.

10. A method of real-time location tracking in a healthcare environment, the method comprising:
- processing, using a controller in a battery-powered fixed transmitter/receiver location device, a beacon message received from a beacon via a network interface, the network interface to enable transmission and receipt of messages via a first communication medium and transmission and receipt of messages via a second communication medium, the network interface to form a smart network with at least one of a receiver or a second device, the smart network to facilitate relay of messages to at least one of a receiver or a second device to be routed to a server;
- generating, using the controller, an information message for a location server based on location information from the beacon message and status information based on a battery level for the transmitter/receiver location device; and
- transmitting, via at least one of the first communication medium or the second communication medium, the information message, wherein transmitting includes, when a battery level of the device is below a battery threshold, deactivating the first communication medium in the network interface and relaying the information message via the smart network to at least one of the receiver or the second device to be routed to the server.

11. The method of claim 10, further including triggering the transmitter/receiver location device from an idle state to an operating state based on feedback from a sensor in the transmitter/receiver location device.

12. The method of claim 10, wherein the smart network includes a mesh network.

13. The method of claim 10, wherein the first communication medium includes Wi-Fi communication and wherein the second communication medium includes Bluetooth Low Energy (BLE) communication.

14. The method of claim 10, wherein the information message is to be relayed to at least one of the at least one of a receiver or a second device when the network interface is unable to communicate with the server.

15. The method of claim 10, further including adjusting an operating state of the device based on the battery level and a maintenance schedule provided by the server.

16. The method of claim 10, further including determining the location information using the beacon message and at least one of the receiver or the second device via the smart network.

17. At least one tangible computer-readable storage medium including instructions which, when executed by at least one processor in a battery-powered fixed transmitter/receiver location device, cause the at least one processor to at least:
- process a beacon message received from a beacon via a network interface, the network interface to enable transmission and receipt of messages via a first communication medium and transmission and receipt of messages via a second communication medium, the network interface to form a smart network with at least one of a receiver or a second device, the smart network to facilitate relay of messages to at least one of a receiver or a second device to be routed to a server;
- generate an information message for a location server based on location information from the beacon message and status information based on a battery level for the transmitter/receiver location device; and
- transmit, via at least one of the first communication medium or the second communication medium, the information message, wherein transmitting includes, when a battery level of the device is below a battery threshold, deactivating the first communication medium in the network interface and relaying the information message via the smart network to at least one of the receiver or the second device to be routed to the server.

18. The at least one tangible computer-readable storage medium of claim 17, wherein the information message is to be relayed to at least one of the at least one of a receiver or a second device when the network interface is unable to communicate with the server.

19. The at least one tangible computer-readable storage medium of claim 17, wherein the instructions, when executed, cause the at least one processor to adjust an operating state of the device based on the battery level and a maintenance schedule provided by the server.

20. The at least one tangible computer-readable storage medium of claim 17, wherein the instructions, when executed, cause the at least one processor to determine the location information using the beacon message and at least one of the receiver or the second device via the smart network.

* * * * *